(12) United States Patent
Stefani et al.

(10) Patent No.: US 12,215,774 B2
(45) Date of Patent: Feb. 4, 2025

(54) SYSTEMS AND METHODS FOR GEARBOX FLUID RESERVOIR

(71) Applicant: DANA ITALIA S.R.L., Trentino (IT)

(72) Inventors: Matteo Stefani, Reggio Emilia (IT); Matteo Dallapiccola, Trento (IT)

(73) Assignee: DANA ITALIA S.R.L., Arco (IT)

( * ) Notice: Subject to any disclaimer, the term of this patent is extended or adjusted under 35 U.S.C. 154(b) by 61 days.

(21) Appl. No.: 18/059,334

(22) Filed: Nov. 28, 2022

(65) Prior Publication Data

US 2024/0175486 A1 May 30, 2024

(51) Int. Cl.
*F16H 57/04* (2010.01)

(52) U.S. Cl.
CPC ..... *F16H 57/0424* (2013.01); *F16H 57/0416* (2013.01); *F16H 57/0423* (2013.01); *F16H 57/0436* (2013.01); *F16H 57/045* (2013.01); *F16H 57/0457* (2013.01)

(58) Field of Classification Search
CPC .......................... F16H 57/0424; F16H 57/0423
See application file for complete search history.

(56) References Cited

U.S. PATENT DOCUMENTS

| | | | | |
|---|---|---|---|---|
| 1,220,810 A * | 3/1917 | Alquist | ............... | F16H 57/0447 184/6.12 |
| 3,529,698 A * | 9/1970 | Nelson | ............... | F16H 57/0447 184/6.12 |
| 3,625,310 A * | 12/1971 | Herrick | ............... | F16N 19/003 184/6.12 |
| 4,270,497 A * | 6/1981 | Valerio | ............. | F01M 11/0004 184/106 |
| 4,470,324 A * | 9/1984 | Renk | ............... | F16H 57/0423 74/606 R |
| 4,519,348 A * | 5/1985 | Hamilton | ........... | F01M 11/0004 123/196 R |
| 4,630,711 A * | 12/1986 | Levrai | ..................... | F16N 7/28 184/6.12 |
| 4,721,184 A * | 1/1988 | Sowards | ................. | F16N 29/04 184/6.12 |
| 4,842,100 A * | 6/1989 | Cameron | ............ | F16C 33/6659 184/6.12 |
| 4,938,184 A * | 7/1990 | Martin | ............... | F01M 11/0004 184/106 |
| 4,986,235 A * | 1/1991 | Ishii | ................... | F01M 11/0004 123/196 R |
| 5,038,631 A * | 8/1991 | Renk | ...................... | B61C 17/08 277/412 |
| 5,768,954 A * | 6/1998 | Grabherr | ............. | F16H 57/0447 74/606 R |
| 6,223,616 B1 * | 5/2001 | Sheridan | .............. | F16H 1/2827 184/6.12 |

(Continued)

*Primary Examiner* — Michael A Riegelman
(74) *Attorney, Agent, or Firm* — McCoy Russell LLP

(57) ABSTRACT

Methods and systems are provided for a lubricating apparatus for a gearbox. In one example, an apparatus may include a curved shroud enclosing a portion of a gear, a first side oil collector and a second side oil collector, an oil reservoir having a first end fluidly coupled to the first side oil collector and a second end fluidly coupled to the second side oil collector, and a metering orifice fluidly coupling the oil reservoir to the curved shroud. The oil reservoir further includes at least two U-turns between the first end and the second end, and walls of the oil reservoir having multiple cavities.

16 Claims, 10 Drawing Sheets

(56) References Cited

U.S. PATENT DOCUMENTS

| | | | | |
|---|---|---|---|---|
| 6,299,561 B1* | 10/2001 | Kramer | ............... | F16H 57/0447 184/6.12 |
| 6,616,432 B2* | 9/2003 | Szczepanski | ........... | F04C 2/082 184/6.12 |
| 6,647,578 B2* | 11/2003 | Morgan | ..................... | A47L 5/30 15/49.1 |
| 6,729,292 B1* | 5/2004 | Bock | ....................... | F01M 11/08 184/106 |
| 7,213,682 B2* | 5/2007 | Gibson | ............... | F16H 57/0421 184/6.12 |
| 7,421,921 B2* | 9/2008 | Kimura | ................ | F16H 57/043 184/6.12 |
| 7,686,137 B2* | 3/2010 | Tominaga | ........... | F16H 57/0408 184/6.12 |
| 7,883,439 B2* | 2/2011 | Sheridan | .................. | F02C 7/36 475/159 |
| 8,393,248 B2* | 3/2013 | Nagahama | .......... | F16H 57/0006 184/6.12 |
| 8,534,425 B2* | 9/2013 | Jabs | .................... | F16H 57/0447 184/11.1 |
| 8,672,094 B2* | 3/2014 | Quehenberger | .... | F16H 57/0457 184/6.12 |
| 8,707,826 B2* | 4/2014 | Jacobs | ................ | F16H 57/0447 74/606 R |
| 8,746,405 B2* | 6/2014 | Perakes | ............... | F16H 57/0409 184/6.12 |
| 8,899,381 B2* | 12/2014 | Ebihara | ............... | F16H 57/0423 184/6.12 |
| 9,038,779 B2* | 5/2015 | McCune | ............. | F16H 57/0423 184/6.11 |
| 9,435,421 B2* | 9/2016 | Mafune | ............... | F16H 57/0483 |
| 9,551,247 B2* | 1/2017 | Michel | ................ | F16H 57/0443 |
| 9,772,027 B2* | 9/2017 | Preston | ............... | F16H 57/0409 |
| 9,803,741 B2* | 10/2017 | Ohmura | ............... | F16H 57/0428 |
| 9,810,311 B1* | 11/2017 | Zhang | ............... | F16H 57/0483 |
| 9,829,050 B2* | 11/2017 | Shimazaki | ............ | F16H 57/027 |
| 9,856,971 B2* | 1/2018 | Mikami | ................ | F16H 57/045 |
| 10,208,848 B2* | 2/2019 | Hotait | ................ | F16H 57/0463 |
| 10,781,909 B2* | 9/2020 | Graves | ................... | H02K 7/116 |
| 2005/0103570 A1* | 5/2005 | Gibson | ............... | F16H 57/0421 184/6.12 |
| 2007/0251348 A1* | 11/2007 | Hayes | ................ | F16H 57/0434 74/606 R |
| 2008/0190497 A1* | 8/2008 | Varda | ........................ | F15B 1/26 137/574 |
| 2009/0090096 A1* | 4/2009 | Sheridan | .................. | F02C 7/36 60/226.3 |
| 2009/0165587 A1* | 7/2009 | Ariga | ................ | F16H 57/0423 475/160 |
| 2009/0314580 A1* | 12/2009 | Jabs | ................ | F16H 57/0447 184/11.1 |
| 2010/0180721 A1* | 7/2010 | Quehenberger | .... | F16H 57/0447 74/606 R |
| 2011/0041649 A1* | 2/2011 | Iwata | ................... | F16H 57/0447 74/606 R |
| 2012/0073403 A1* | 3/2012 | Perakes | ............... | F16H 57/0409 74/607 |
| 2013/0102432 A1* | 4/2013 | Imai | ..................... | F16H 57/045 475/159 |
| 2017/0030457 A1* | 2/2017 | Hotait | ................ | F16H 57/0463 |
| 2017/0102064 A1* | 4/2017 | Preston | ............... | F16H 57/0483 |
| 2018/0149260 A1* | 5/2018 | Singh | ................ | F16H 57/0423 |
| 2018/0259060 A1* | 9/2018 | Poster | ................ | F16H 57/0457 |
| 2024/0175486 A1* | 5/2024 | Stefani | ............... | F16H 57/045 |
| 2024/0200647 A1* | 6/2024 | Dallapiccola | ............ | F16N 7/28 |

* cited by examiner

SYSTEMS AND METHODS FOR GEARBOX FLUID RESERVOIR

TECHNICAL FIELD

The present description relates generally to methods and systems for lubrication and thermal dissipation in a splash lubricated gearbox.

BACKGROUND AND SUMMARY

In various types of splash lubricated gearboxes, one or more gears are partially immersed in lubricant fluid. A gear of a splash lubricated gearbox may rotate in both directions (e.g., clockwise and counterclockwise) at the same speed, for example, in off-highway transmissions. In these systems, moving parts use at least a minimum amount of lubricant fluid, provided by splashing of the one or more gears, to reduce friction in the moving parts. The lubricant fluid has a double effect: lubrication of mechanisms and thermal dissipation. Fluid temperature of the lubricating fluid may affect a useable life of the lubricating fluid, where high fluid temperatures accelerate an aging of the lubricating fluid and a decrease in lubricating ability of the lubricating fluid. Therefore, maintaining the fluid temperature within a desired range is important for a usability of the gearbox.

A common way to provide a sufficient amount of lubrication and thermal dissipation in a splash lubricated gearbox system is to increase an amount of lubricating fluid (e.g., oil or other lubricating fluid) in the gearbox. However, this solution is in contrast with current developments in systems which include gearboxes, specifically systems having electrification processes which attempt to increase system efficiency. An increased amount of lubricating fluid in the gearbox increases mechanical power losses generated by a churning effect, as well as an increase in the fluid temperature.

A typical approach for maintaining the fluid temperature within a desired temperature range is to include a wide heat exchange surface within the gearbox. However, this may not always be possible, as an increase in the gearbox and/or at least one or more lower gears may not be achievable within the footprint (e.g., external dimensions) of the system in which the gearbox is integrated. When the gearbox is not configured with a heat exchange surface wide enough to dissipate generated heat, performance of the gearbox may be reduced. In addition to an amount of lubricating fluid, a type of lubricating fluid may affect lubrication and thermal dissipation. To reduce and/or prevent mechanical problems due to metal-on-metal friction, the lubricating fluid may have a first, desired viscosity. Lubricating fluid having a higher viscosity compared to the first, desired viscosity may introduce the same problems as when an excess amount of lubricating fluid is included in the gearbox (e.g., increased mechanical power loss and fluid temperature).

Other attempts to address sufficient lubrication and thermal dissipation in a splash lubricated gearbox include a design for a gearbox which enables control of drain and liquid level equalizing in the gearbox. One example approach is shown by Herrick in U.S. Pat. No. 3,625,310. Therein, systems and methods are provided for a device that includes a housing having spaced fill and drain openings and containing meshing gears and a liquid for lubricating and cooling the gears. The housing includes a baffle member partially enclosing the gears. The baffle member divides the housing into upper and lower chambers, has portions extending above the level of the liquid, and has a port coaxially aligned with the drain opening. The device further includes a plug in the drain opening having an extended portion, said extended portion including a passageway providing restricted liquid flow between said chambers when said plug is in a first position. The plug is moveable in the drain opening to a second position, wherein said extended portion is out of said port, providing substantially uninhibited liquid flow between said chambers through said port. When the gears are placed in motion, rotation of a gear splashed lubricant from the upper chamber into the lower chamber, and a sufficient level of lubricant may remain in the upper chamber to engage teeth of the gear. As lubricant in the upper chamber is consumed (e.g., splashed into the lower chamber), additional lubricant flows through the restricted passageway in the plug form the lower chamber into the upper chamber.

Additionally, in an example approach shown by Ohmura et al. in U.S. Pat. No. 9,803,741, systems and methods are provided for a lubricating structure for a differential device, including a pair of baffle plates, fixed to a transmission case, partitioning an internal space between the transmission case and a differential case and a final driven gear and a second space. The baffle plates are configured such that the amount of lubricating oil accumulated in the first space is smaller than that in the second space. In this lubricating structure, splash of lubricating oil from the first space to the second space may be controlled. Lubricating oil accumulating in the second space may not be agitated by rotation of the differential case and the final driven gear. Accordingly, the oil level in the second space may be high to increase the total amount of lubricating oil such that cooling performance can be improved by virtue of a larger heat mass.

However, the inventors herein have recognized potential issues with such systems. As one example, the upper and lower chambers of the housing described in U.S. Pat. No. 3,625,310, which may at least partially fill with liquid during operation of the device (e.g., rotation of the gears), may not provide sufficient thermal dissipation, and therefore cooling, of the lubricating fluid. In the lubricating structure described in U.S. Pat. No. 9,803,741, relying on cooling by virtue of the larger heat mass may also provide insufficient thermal dissipation.

In one example, the issues described above may be addressed by an apparatus, comprising a curved shroud enclosing a portion of a gear, a first side oil collector, a second side oil collector, an oil reservoir having a first end fluidly coupled to the first side oil collector and a second end fluidly coupled to the second side oil collector, the oil reservoir turning back on itself at least twice between the first end and the second end, and walls of the oil reservoir having multiple cavities, and a metering orifice fluidly coupling the oil reservoir to the curved shroud. In this way, greater thermal dissipation may be provided by distributing a total volume of lubricating fluid throughout sections of the oil reservoir and enabling increased thermal dissipation through walls of the oil reservoir.

As one example, precise lubrication may be enabled by controlling directions of lubricating fluid droplets generated by a gear splashing effect. Thermal dissipation may be leveraged by walls of the oil reservoir having high heat exchange surface of the cavities, the design of which may be enabled by additive manufacturing. Further, power losses may be reduced by controlling an amount of lubricating fluid in contact with a rotating wheel. The apparatus may be formed of high thermal dissipation material, which, in addition to the at least two U-turns of the oil reservoir which increase a surface area which the lubricating fluid is in contact with, may increase thermal dissipation of the lubricating fluid. The above described advantages may be achieved without addition of moving elements, thus the system complexity may not be increased compared to conventional lubrication systems.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
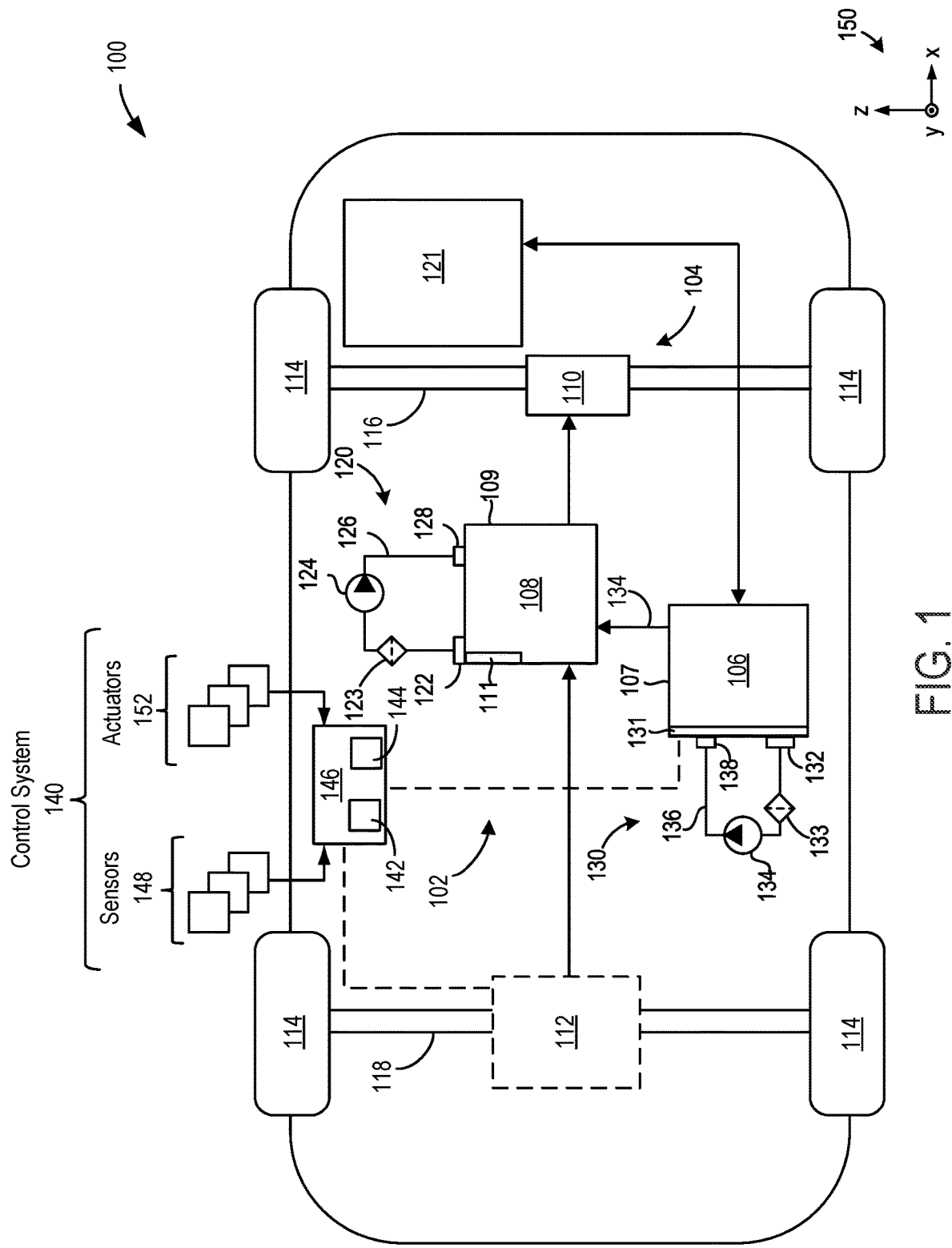
FIG. 1 shows a schematic representation of a drive system with lubrication and cooling assemblies.
Figure 2A:
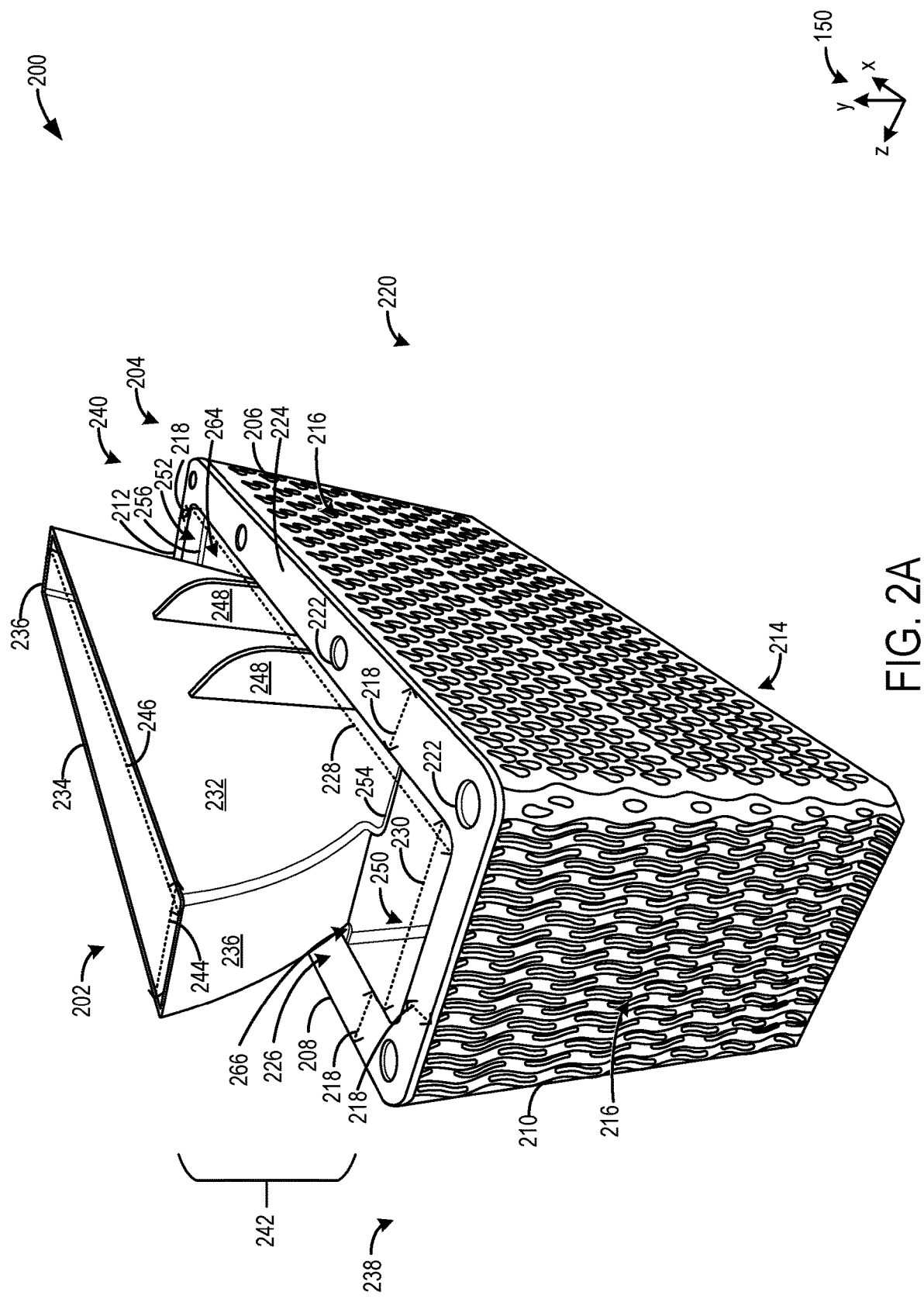
FIG. 2A shows a perspective view of a gearbox, according to one example.

The following description relates to systems and methods for enhancing a heat exchange process and improving efficiency of a gearbox. The gearbox described herein may be implemented in a drive system of a vehicle, an example of which is shown in FIG. 1. The gearbox may include a gearbox housing coupled to an apparatus including the curved shroud enclosing a portion of a gear, a first side oil collector, a second side oil collector, an oil reservoir having a first end fluidly coupled to the first side oil collector and a second end fluidly coupled to the second side oil collector, the oil reservoir turning back on itself at least twice between the first end and the second end, and walls of the oil reservoir having multiple cavities, and a metering orifice fluidly coupling the oil reservoir to the curved shroud. A perspective view of the apparatus is shown in FIG. 2A, and various cross-sectional views of the apparatus are shown in FIGS. 3-7, the cross-sectional views taken along cross-section lines shown in FIG. 2B. FIGS. 2A-7 are shown approximately to scale, however other relative component dimensions may be used, in other embodiments.

Turning now to FIG. 1, a schematic representation of a vehicle 100 is depicted which includes sets of wheels 114 coupled by axles 104 (e.g., pairs of wheels are coupled to one another by the axles 104). For a hybrid electric vehicle (HEV), torque may be provided to a vehicle's wheels from more than one source, including one or more electric motors. It will be appreciated that vehicle 100 is shown in FIG. 1 for illustrative purposes and is a non-limiting example of how an HEV may be configured. Other examples include various arrangements and positioning of components of the vehicle described below as well as additional components not shown in FIG. 1 for brevity.

The vehicle 100 includes a drive system 102 that provides power to and/or is incorporated into an axle assembly 104 of the vehicle 100. FIG. 1 illustrates the axle assembly 104 as including a rear axle 116, however the axle assembly may additionally or alternatively include a front axle 118 in some examples. The vehicle 100 may take a variety of forms in different examples, such as a light, medium, or heavy duty vehicle. Additionally, the drive system 102 may be adapted for use in steerable and non-steerable axles. To generate power, the drive system 102 may include at least one electric machine 106. In some examples, the electric machine 106 may be an electric motor-generator and may thus include conventional components such as a rotor, a stator, and the like housed within an electric machine housing 107 for generating mechanical power as well as electric power during a regenerative mode, in some cases. Further, in other examples, the vehicle 100 may include an additional motive power source, such as an internal combustion engine (ICE) 112 (e.g., a spark and/or compression ignition engine), for providing power to another axle. As such, the drive system 102 may be utilized in an electric vehicle (EV), such as a hybrid electric vehicle (HEV) or a battery electric vehicle (BEV). For example, the electric machine 106 may be electrically coupled to a traction battery 121 of vehicle 100 to both draw power from the traction battery 121 and provide electrical energy to be stored at the traction battery 121. For example, the traction battery 121 may be a high-voltage battery. In some embodiments, the traction battery 121 may be a generic DC-supply, such as a fuel cell or other power supply.

In some examples, the electric machine 106 may provide mechanical power to a differential 110 via the gearbox 108. From the differential 110, mechanical power may be transferred to drive wheels 114 by way of the rear axle 116 of the axle assembly 104. As such, the differential 110 may distribute torque, received from the electric machine 106 via the gearbox 108, to the wheels 114 of the axles 104 during certain operating conditions. In some examples, the differential 110 may be a locking differential, an electronically controlled limited slip differential, or a torque vectoring differential.

The gearbox 108 may be a single-speed gearbox, where the gearbox operates in one gear ratio. However, other gearbox arrangements have been envisioned such as a multi-speed gearbox that is designed to operate in multiple distinct gear ratios. Further, in one example, the electric machine 106, the gearbox 108, and the differential 110 may be incorporated into the axle 104, forming an electric axle (e-axle) in the vehicle 100. The e-axle, among other functions, for provides motive power to the wheels 114 during operation. Specifically, in the e-axle embodiment, the electric machine and gearbox assembly may be coupled to and/or otherwise supported by an axle housing. In one particular example, the e-axle may be an electric beam axle where a solid piece of material (e.g., a beam, a shaft, and/or a housing) extend(s) between the drive wheels). The e-axle may provide a compact arrangement for delivering power directly to the axle. In other examples, however, the electric machine 106 and the gearbox 108 may be included in an electric transmission in which the gearbox and/or electric motor are spaced away from the axle. For instance, in the electric transmission example, mechanical components such as a driveshaft, joints (e.g., universal joints), and the like may provide a rotational connection between the electric transmission and the drive axle.

The drive system 102 may further include an oil circuit 120 for circulating oil (e.g., natural and/or synthetic oil) through the gearbox housing 109 to lubricate and/or cool various system components. The oil circuit 120 may include a filter 123 and an oil pump 124 that draws oil from an oil reservoir 111 (e.g., a sump) in the gearbox housing 109, via an outlet 122, and drives a pressurized oil flow through a delivery line 126 to an inlet 128 of the gearbox housing 109. In some examples, the oil pump 124 may be provided at an exterior portion of the gearbox housing 109. However, in other examples, the oil pump may be included within the housing 109. Various distribution components and arrangements (e.g., nozzles, valves, jets, oil passages, and the like) of the oil circuit 120 may be included within the drive system 102 in order to facilitate routing of the oil within the gearbox housing 109 and, in one particular example, to a portion of the electric machine housing 107. In some case, the oil circuit 120 may be used for routing oil to various gearbox shafts and gears as well as a rotor shaft bearing of the electric machine, thereby providing an efficient system for effectively using the gearbox oil to cool said bearing. An exemplary apparatus which may be included in the gearbox for lubricating and cooling particular components is expanded upon herein with reference to FIGS. 2A-7.

The drive system 102 may further include a coolant circuit 130 that circulates coolant (e.g., water and/or glycol) through a water jacket 131 formed in the electric machine housing 107, in one example. The coolant circuit 130 may include a coolant inlet 138 and a coolant outlet 132 positioned on (or in) the electric machine housing 107. The coolant circuit 130 may further include a filter 133 and a coolant pump 134 that circulates coolant from the coolant outlet 132 to the coolant inlet 138 via a coolant delivery line 136. From the coolant inlet 138, the coolant travels into the water jacket 131 formed in the electric machine housing 107 which removes heat from components of the electric machine 106. In some examples, the coolant circuit 130 may further include a heat exchanger (e.g., radiator) which removes heat from the coolant that exits the electric machine housing 107 by way of the coolant outlet 132. However, in alternate examples, the coolant circuit may be omitted from the system.

The vehicle 100 may also include a control system 140 with a controller 146. The controller 146 may include a processor 142 and a memory 144. The memory may hold instructions stored therein that when executed by the processor cause the controller 146 to perform various methods, control techniques, and the like described herein. The processor 142 may include a microprocessor unit and/or other types of circuits. The memory 144 may include known data storage mediums such as random access memory, read only memory, keep alive memory, combinations thereof, and the like. The controller 146 may receive various signals from sensors 148 positioned in different locations in the vehicle 100 and drive system 102. The controller 146 may also send control signals to various actuators 152 coupled at different locations in the vehicle 100 and drive system 102. For instance, the controller 146 may send command signals to the oil pump 124 and/or the coolant pump 134 and, in response, the actuator(s) in the pump(s) may be adjusted to alter the flowrate of the oil and/or coolant delivered therefrom. In other examples, the controller may send control signals to the electric machine 106 and, responsive to receiving the command signals, the electric machine may be adjusted to alter a rotor speed. The other controllable components in the system may be operated in a similar manner with regard to sensor signals and actuator adjustment.

An axis system 150 is provided in FIG. 1, as well as FIGS. 2A-7, for reference. The y-axis may be a vertical axis (e.g., parallel to a gravitational axis), the x-axis may be a lateral axis (e.g., horizontal axis), and/or the z-axis may be a longitudinal axis, in one example. However, the axes may have other orientations, in other examples.

Turning to FIG. 2A, an apparatus 200 for a gearbox is shown, the apparatus 200 configured to provide sufficient lubrication to moving elements of the gearbox using lubricating fluid and further to provide sufficient cooling of the lubricating fluid and thus, of moving elements. For example, the apparatus 200 may be implemented in the gearbox 108 of FIG. 1 (e.g., positioned in the gearbox housing 109, as further described with respect to FIG. 3). Targeted lubrication and cooling may be achieved without adding moving parts to a base gearbox design, therefore not increasing a complexity of the gearbox.

The apparatus 200 includes a curved shroud 202 fluidly coupled to an oil reservoir formed in an oil reservoir base 204. The oil reservoir may be an example of the oil reservoir 111 of FIG. 1. The oil reservoir base 204 is formed of a base front wall 206, a base rear wall 208, a base first side wall 210, a base second side wall 212, and a base bottom 214. Each of the base front wall 206, the base rear wall 208, the base first side wall 210, the base second side wall 212 are herein collectively referred to as walls of the oil reservoir. The walls of the oil reservoir are formed with multiple cavities 216 which extend through a first width 218 of each of the walls of the oil reservoir. For example, the cavities 216 may extend from an exterior 220 of the apparatus 200. In this way, airflow may travel from the exterior 220 into the cavities 216, which may increase thermal dissipation provided by the walls of the oil reservoir. The cavities 216 may have a gyroid infill pattern, in some examples, which increases a heat exchange surface area compared to designs with oil reservoir walls without gyroid infill pattern and/or cavities. In some examples, the cavities 216 may have infill patterns, other than a gyroid infill pattern, which increase the surface area of the cavities 216. Further detail regarding the cavities 216 and thermal dissipation enabled by the cavities 216 is described with respect to FIG. 7. Walls of the oil reservoir, as well as the curved shroud 202, may be formed by additive manufacturing techniques, such as 3D-printing. Additionally, walls of the oil reservoir as well as the curved shroud 202 may be formed of a high thermal conductivity material which enables heat exchange, such as aluminum. A plurality of mounting openings 222 positioned around a top face 224 of the oil reservoir base 204 may enable the oil reservoir base 204 to be coupled to a gearbox housing, as described with respect to FIG. 3. As further described herein, the walls of the oil reservoir form an interior region 226 having a base length 228 and a base width 230, where the curved shroud 202 and other elements of the oil reservoir are positioned in the interior region 226.

The curved shroud 202 may be formed of a front wall 232, a rear wall 234, and a base curve 236 which extends from a first lateral side 238 to a second lateral side 240 of the curved shroud 202 and is continuous with the front wall 232 and the rear wall 234. For example, the curved shroud 202 may be semi-circular, such as a semi-circular baffle. In some examples, the curved shroud 202 may be formed of a single piece or formed of two or more pieces in other examples. The curved shroud 202 may extend a first height 242 above the oil reservoir base 204 to at least partially enclose a portion of a gear, as further described with respect to FIG. 3. The curved shroud 202 further has a shroud length 246 and a shroud width 244 which are less than the base length 228 and the base width 230 of the interior region 226 of the oil reservoir base 204, respectively. The curved shroud 202 partially extends a second height into the interior region 226 of the oil reservoir base 204, as further described with respect to FIG. 3, such that walls of the oil reservoir surround the second height of the curved shroud 202.

The curved shroud 202 may be coupled to and inset from the base front wall 206 and the base rear wall 208 by a plurality of support braces 248. The curved shroud 202 may be positioned in the oil reservoir base 204 towards the base rear wall 208, along the base width 230. For example, a distance between the rear wall 234 and the base rear wall 208 may be less than a distance between the front wall 232 and the base front wall 206. The distances between the curved shroud and the base front wall 206 and base rear wall 208 may enable airflow around the front wall 232 and the rear wall 234 of the curved shroud 202, which may enable thermal dissipation from walls of the curved shroud 202 through the air.

Additionally, the oil reservoir base 204 includes a first side oil collector 250 on the first lateral side 238 and a second side oil collector 252 on the second lateral side 240. The first side oil collector 250 may be formed by the base first side wall 210, the base front wall 206, the base rear wall 208, and a first wall 254 extending between the base front wall 206 and the base rear wall 208 on the first lateral side 238 of the curved shroud 202. The second side oil collector 252 may be formed by the base second side wall 212, the base front wall 206, the base rear wall 208, and a second wall 256 extending between the base front wall 206 and the base rear wall 208 on the second lateral side 240 of the curved shroud 202. As further described herein with respect to FIGS. 3-7, the first side oil collector 250 and the second side oil collector 252 are fluidly coupled to each other via the oil reservoir of the oil reservoir base 204. As further described with respect to FIGS. 3-7, a metering orifice positioned at approximately a center of the base curve 236 of the curved shroud 202 (e.g., along the shroud length 246) fluidly couples the curved shroud 202 to the oil reservoir.

The first wall 254, the second wall 256, the front wall 232 of the curved shroud 202, and the base front wall 206 of the oil reservoir base 204 delimit a first closed tank 264 which is positioned between, and separated from, the first side oil collector 250 and the second side oil collector 252 by the first wall 254 and the second wall 256, respectively. In some examples, the first wall 254 and the second wall 256 may extend along the z-axis (e.g., with respect to the axis system 150) and, along with the rear wall 234 of the curved shroud 202 and the base rear wall 208 of the oil reservoir base 204, form a second closed tank 266. As further described with respect to FIGS. 5A-5C, the first closed tank 264 and the second closed tank 266 may capture lubricating fluid which is not captured by either of the first side oil collector 250 and/or the second side oil collector 252. Each of the first closed tank 264 and the second closed tank 266 may be fluidly coupled to the oil reservoir via a drain channel, as described with respect to FIGS. 5A-5C.

Figure 2B:
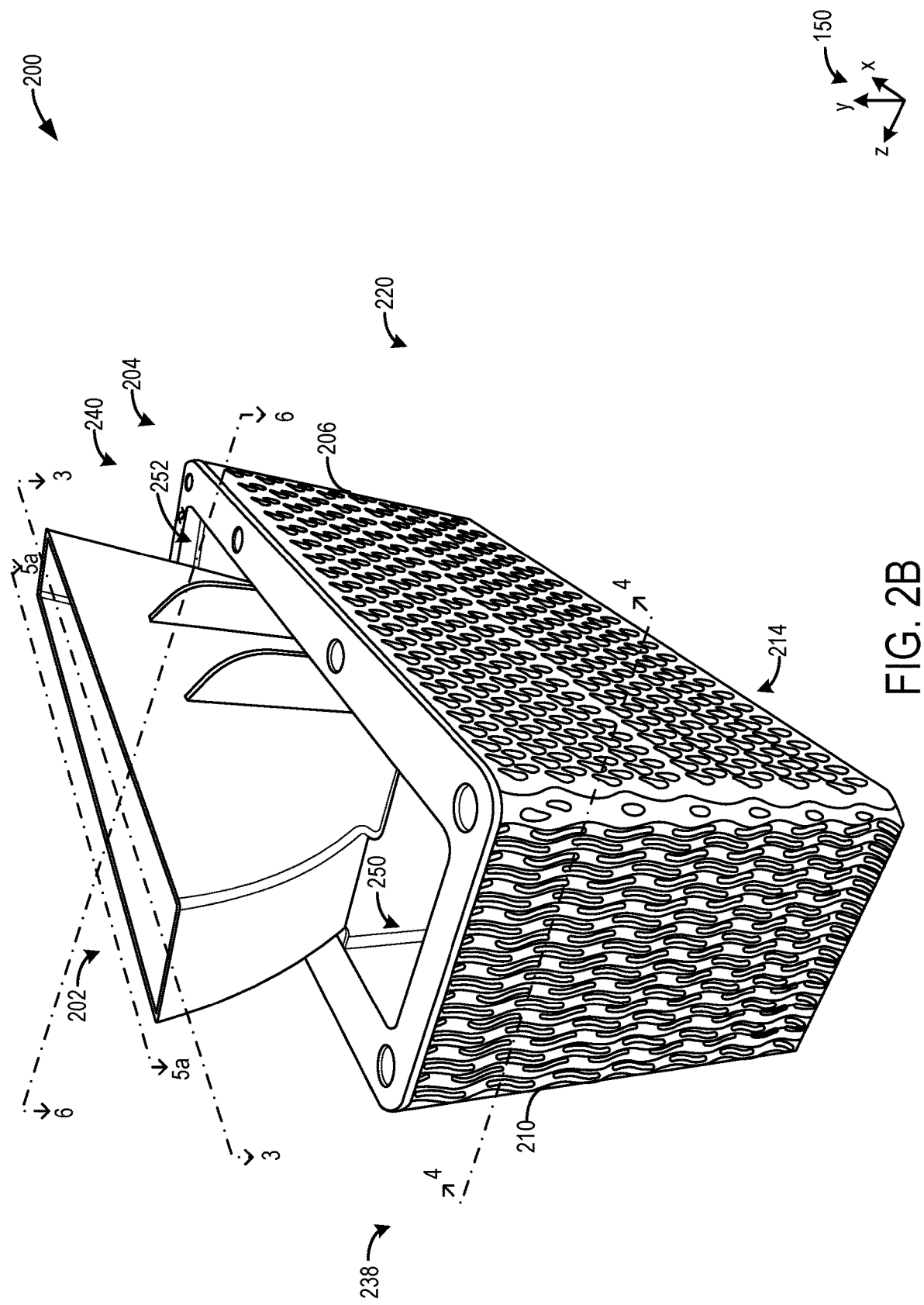
FIG. 2B shows the perspective view of the gearbox of FIG. 2A with cross-section lines.
Figure 3:
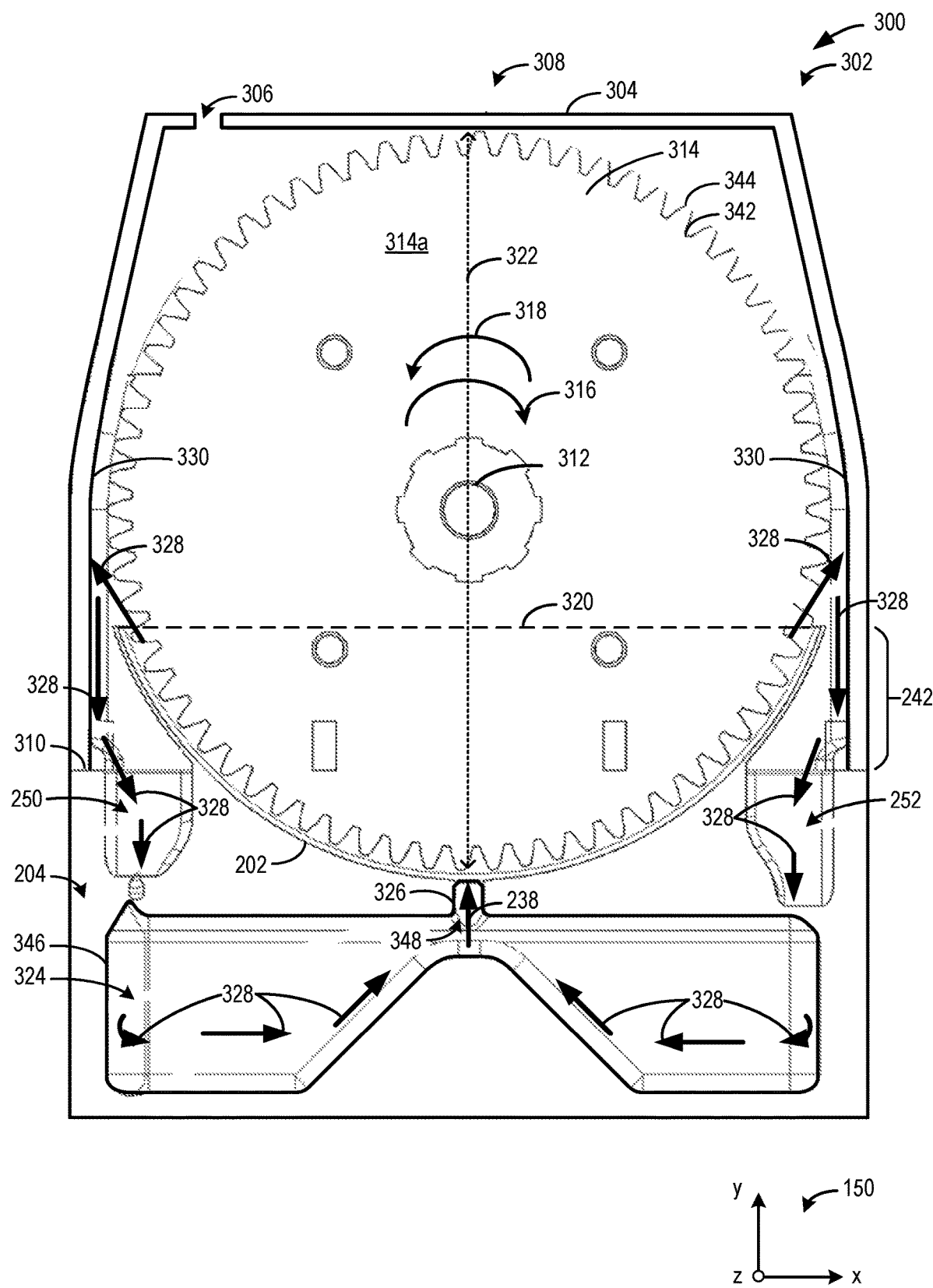
FIG. 3 shows a cross-section of the gearbox of FIGS. 2A-2B.

Turning to FIG. 3, a cross-sectional view 300 is shown of the apparatus 200 of FIG. 2A positioned in gearbox 302. The cross-section shown in the cross-sectional view 300 is taken along line 3-3 of FIG. 2B. As described with respect to FIG. 2A, the apparatus 200 is configured with elements used to provide a desired amount of lubrication and thermal dissipation to moving components of the gearbox 302 via a lubricating fluid. The gearbox 302 may be an example of the gearbox 108 of FIG. 1. The apparatus 200 includes the curved shroud 202 fluidly coupled to an oil reservoir 346 of the oil reservoir base 204.

The gearbox 302 includes a gearbox housing 304, which may be an example of the gearbox housing 109 of FIG. 1. As briefly described with respect to FIG. 2A, the gearbox housing 304 may be coupled to the apparatus 200 at mounting openings 222 (e.g., the mounting openings 222 shown in FIGS. 2A, 2B, 4, 5, and 7) of the oil reservoir base 204, for example, using threaded fasteners or other fasteners which enable face-sharing contact between the gearbox housing 304 and the top face 224 of the oil reservoir base 204. The apparatus 200 and the gearbox housing 304 may be coupled such that lubricating fluid and/or other fluids such as water may not enter or exit the gearbox 302 at a mating 310 between the apparatus 200 and the gearbox housing 304.

The gearbox housing 302 may have an inlet 306 located at a top 308 of the gearbox housing 304, in some examples. The gearbox 302 further includes an outlet of the oil reservoir 346, as further described with respect to FIGS. 5A-5C. For example, the outlet may be formed in the oil reservoir 346 of the oil reservoir base 204. Otherwise, the gearbox housing 304 coupled to the apparatus 200 may seal the gearbox 302 from the system in which the gearbox 302 is integrated, such as the drive system 102 of FIG. 1, so that lubricating fluid enters and exits the gearbox 302 through the inlet 306 and the outlet, respectively. Lubricating fluid, such as oil, may be delivered to the gearbox 302 via the inlet 306 from a delivery line, such as the delivery line 126 of the oil circuit 120 of FIG. 1. As further described herein, the lubricating fluid may be directed through elements of the gearbox 302 to lubricate moving (e.g., rotating) elements and cool the moving elements via thermal dissipation. Rotating elements of the gearbox 302 may be used to provide mechanical power (e.g., rotational power) to elements coupled to the gearbox 302, as described with respect to FIG. 1.

The gearbox 302 further includes a journal shaft 312 on which a gear 314 may be positioned. The gear 314 may be a toothed wheel which is fixedly coupled to the journal shaft 312 such that the gear 314 is rotated by rotation of the journal shaft 312. In other examples, the gearbox 302 may include at least one additional gear in meshing contact with the gear 314, such that the gear 314 is rotated by rotation of the at least one additional gear. The gear 314 may be rotated in a first direction 316 (e.g., clockwise) and/or a second direction 318 (e.g., counterclockwise).

As briefly described with respect to FIG. 2A, the curved shroud 202 at least partially encloses the gear 314. For example, the front wall and the rear wall of the curved shroud 202 may each be parallel to a front face 314a and a rear face, opposite the front face 314a, of the gear 314, respectively. A dashed line 320 indicates a total height of the curved shroud 202 (e.g., the first height 242 and the second height that the curved shroud 202 extends into the interior region 226 of the oil reservoir base 204). The curved shroud 202 (e.g., the total height thereof) may extend approximately half of a height 322 of the gear 314. A degree of curvature of the base curve 236 may be complementary to a curvature of the gear 314. The base curve 236 may be positioned a distance apart from teeth of the gear 314, such that the lubricating fluid may flow between teeth of the gear 314 and the base curve 236, and further so that the teeth of the gear 314 may not come in contact with the base curve 236. For example, the base curve 236 may be positioned 1-10 mm apart from teeth of the gear 314, in one use-case example.

However, the base curve 236 and the gear teeth may be spaced apart to a greater degree, in other examples.

The oil reservoir base 204 includes the first side oil collector 250 and the second side oil collector 252 fluidly coupled to the oil reservoir 346. As further described with respect to FIGS. 5A-5C, the first side oil collector 250 may be angled a first direction away from a plane in which the gear 314 is positioned (e.g., the y-x plane, with respect to the axis system 150) and the second side oil collector 252 may be angled a second direction, opposite the first direction, away from the plane in which the gear 314 is positioned. The oil reservoir 346 may be formed of three sections, where the first side oil collector 250 is coupled to a first oil reservoir section and the second side oil collector 252 is coupled to a third oil reservoir section. The oil reservoir 346 turns back on itself at least twice between the first side oil collector 250 and the second side oil collector 252. For example, each of the first oil reservoir section and the third oil reservoir section are coupled to a second oil reservoir section 324 via a first U-turn and a second U-turn, respectively. Each of the first U-turn and the second U-turn turn a direction of the oil reservoir 346 approximately 180 degrees with respect to a previous section, as further described with respect to FIGS. 5A-7. A metering orifice 326 fluidly couples the oil reservoir 346, specifically at the second oil reservoir section 324, to the curved shroud 202 such that lubricating fluid may flow from the oil reservoir 346 to the curved shroud, as further described herein with respect to FIGS. 5A-7. Each of the first side oil collector, the second side oil collector, and the metering orifice have at least one of a circular, triangular, rectangular, teardrop, or square cross-section, as further described herein.

As briefly described with respect to FIG. 2A, the curved shroud 202 is configured to control a direction of lubricating fluid which is sprayed and/or splashed by the gear 314 when the gear 314 is rotating. When the gear 314 is not rotating, a volume of lubricating fluid may be retained in the curved shroud 202, where a height of the volume of lubricating fluid is less than the total height of the curved shroud 202 (e.g., indicated by the dashed line 320). When the gear 314 rotates in the first direction 316 or the second direction 318, lubricating fluid may be carried by teeth of the gear 314 (e.g., on a surface of and/or in recesses 342 in between teeth 344) and driven out of the curved shroud 202. For example, when the gear 314 rotates in the first direction 316, a majority of the volume of driven lubricating fluid may be driven out of a left side of the curved shroud 202 (e.g., towards the first side oil collector 250). When the gear 314 rotates in the second direction 318, a majority of the volume of driven lubricating fluid may be driven out of a right side of the curved shroud 202 (e.g., towards the second side oil collector 252). An example path of lubricating fluid flow is shown by a plurality of solid arrows 328. The driven lubricating fluid may splash against lateral walls 330 of the gearbox housing 304 and be directed by gravity down the lateral walls 330, in a direction of gravity, into the oil reservoir base 204. Lubricating fluid may be captured by at least one of the first side oil collector 250 and the second side oil collector 252, which direct the captured lubricating fluid in the direction of gravity into the oil reservoir 346. As described with respect to FIGS. 4-7, the captured lubricating fluid is directed along a length of the serpentine shape of the oil reservoir 346 (e.g., including the first oil reservoir section, the second oil reservoir section, and the third oil reservoir section). As the captured lubricating fluid flows through the oil reservoir 346, the lubricating fluid may be cooled via thermal dissipation enabled by the cavities 216 in the walls of the oil reservoir 346. The captured lubricating fluid is directed from the oil reservoir 346 back into the curved shroud 202 via the metering orifice 326 in a direction opposite the direction of gravity. Cooling and returning of captured lubricating fluid may be performed continuously as the gear 314 is rotated, therefore a sufficient volume of lubricating fluid may be maintained in the curved shroud 202 to engage teeth of the gear 314 and provide sufficient desired cooling and lubrication of the gear 314.

Figure 4:
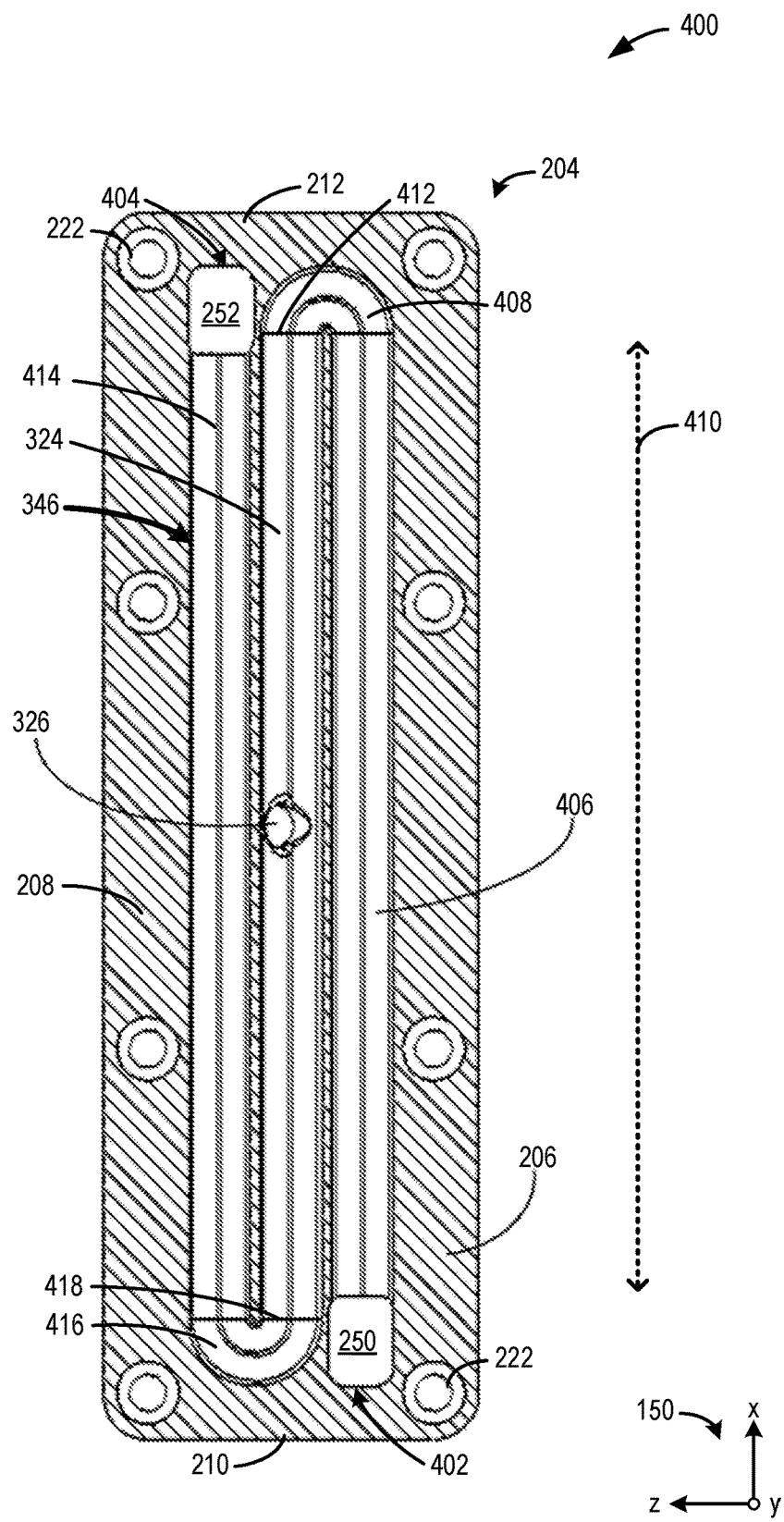
FIG. 4 shows a bottom longitudinal section view of the gearbox of FIGS. 2A-2B.

FIG. 4 shows a cross-sectional view 400 of the oil reservoir base 204, where the cross-section is taken along line 4-4 of FIG. 2B. As described with respect to FIGS. 2A-3, the oil reservoir 346 has a serpentine shape with two U-turns connecting three oil reservoir sections, where the sections are coupled to the first side oil collector 250, the second side oil collector 252, and the curved shroud 202, as further described herein.

A first end 402 of the oil reservoir 346 is fluidly coupled to the first side oil collector 250 and a second end 404 of the oil reservoir 346 is fluidly coupled to the second side oil collector 252. A first oil reservoir section 406 extends from the first end 402 of the oil reservoir 346 to a first U-turn 408, such that the first oil reservoir section 406 has a first length 410. The first oil reservoir section 406 is coupled to the second oil reservoir section 324 by the first U-turn 408 at a first side 412 of the second oil reservoir section 324. A third oil reservoir section 414 extends from the second end 404 of the oil reservoir 346 to a second U-turn 416, such that the third oil reservoir section also has the first length 410. In some examples, a length of the third oil reservoir section 414 may be different from (e.g., greater than or less than) the first length 410. The third oil reservoir section 414 is coupled to the second oil reservoir section 324 by the second U-turn 416 at a second side 418 of the second oil reservoir section 324, opposite the first side 412. A length of the second oil reservoir section 324 may also be equal to the first length 410. In some examples, a length of the second oil reservoir section 324 may be different from (e.g., greater than or less than) the first length 410. The oil reservoir 346 turns back on itself at least twice between the first side oil collector 250 (e.g., the first end 402) and the second side oil collector 252 (e.g., the second end 404). The first U-turn 408 turns the oil reservoir approximately 180 degrees from the first oil reservoir section 406 to the second oil reservoir section 324. The second U-turn 416 turns the oil reservoir 346 approximately 180 degrees from the second oil reservoir section 324 to the third oil reservoir section 414. Collectively, the first oil reservoir section 406, the second oil reservoir section 324, the third oil reservoir section 414, the first U-turn 408, and the second U-turn are herein referred to as sections of the oil reservoir 346. The sections of the oil reservoir 346 are contained within a common plane, such as the x-z plane with respect to the axis system 150. For example, the first U-turn 408 and the second U-turn 416 are in-plane (e.g., in the common plane) with no out-of-plane turns therebetween.

The metering orifice 326 may be positioned at an approximate center of the first length 410 of the second oil reservoir section 324, as further described with respect to FIGS. 5A-7. Walls of the first side oil collector 250, the first oil reservoir section 406, the first U-turn 408, the second oil reservoir section 324, the second U-turn 416, the third oil reservoir section 414, and the second side oil collector 252 may be continuous and formed of uninterrupted high thermal conductivity material, such as aluminum. In other words, walls of the sections of the oil reservoir 346 may not have multiple cavities.

Figure 7:
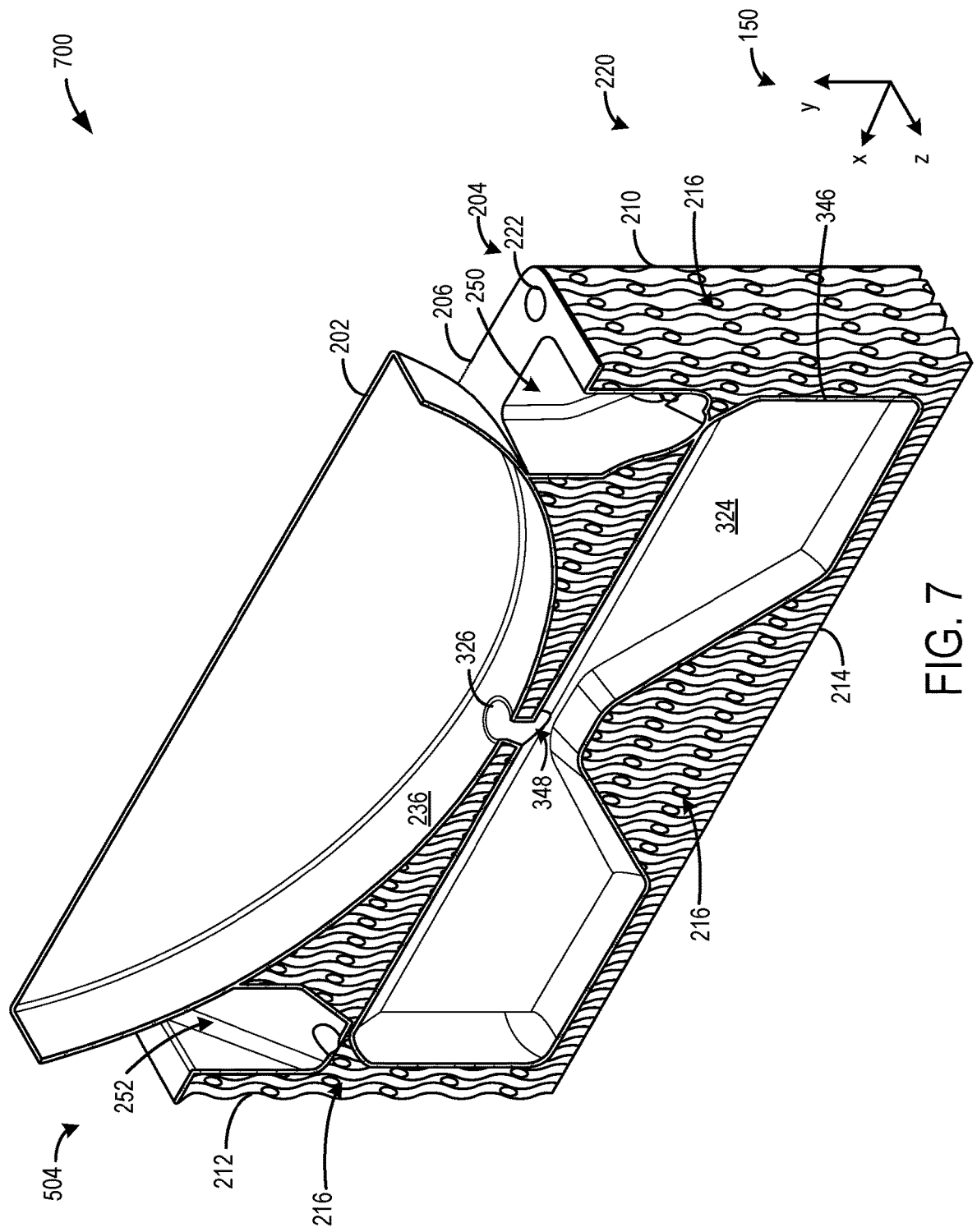
FIG. 7 shows a perspective sectional view of the gearbox of FIGS. 2A-2B.

As described with respect to FIG. 2A, walls of the oil reservoir 346 include the base front wall 206, the base rear wall 208, the base first side wall 210, and the base second side wall 212, each of which have multiple cavities (as shown in FIGS. 2A, 2B, and 7). The base first side wall 210 may extend between the first side oil collector 250 (e.g., the first end 402 of the oil reservoir 346) and the second U-turn 416, and along the first length 410 of the first oil reservoir section 406 between the first oil reservoir section 406 and the second oil reservoir section 324. The base second side wall 212 may extend between the second side oil collector 252 (e.g., the second end 404 of the oil reservoir 346) and the first U-turn 408, and along the first length 410 of the third oil reservoir section 414 and the second oil reservoir section 324. Portions of the base first side wall 210 and the base second side wall 212 which extend between sections of the oil reservoir 346 include the cavities 216, whereas walls of the sections do not include the cavities 216.

The lubricating fluid flowing through the sections of the oil reservoir 346 may be contained in the sections of the oil reservoir 346 by the walls of the sections of the oil reservoir 346, while heat dissipation is enabled by the cavities 216 of the walls of the oil reservoir 346 which extend between the sections of the oil reservoir 346. For example, as the walls of the sections of the oil reservoir 346 and the walls of the oil reservoir 346 are formed of high thermal conductivity material, such as aluminum, heat captured by the lubricating fluid flowing through the sections of the oil reservoir 346 may dissipate from the lubricating fluid and into the high thermal conductivity material. Airflow is enabled through the walls of the oil reservoir 346 by the cavities 216 and circulating airflow may draw heat out of and further cool the high thermal conductivity material of both the walls of the sections of the oil reservoir 346 and walls of the oil reservoir 346. In this way, the high thermal conductivity material which forms the walls of the sections of the oil reservoir 346 and walls of the oil reservoir 346 may be used to cool the lubricating fluid as the high thermal conductivity material is in turn cooled by airflow through the cavities 216. Further detail regarding cooling using the cavities 216 is described with respect to FIG. 7.

As further described with respect to FIGS. 5A-7, a height of each of the first oil reservoir section 406 and the third oil reservoir section 414 may be continuous along the first length 410 of the respective section, and a height of the second oil reservoir section 324 may vary along the first length 410 of the second oil reservoir section 324. A volume of lubricating fluid which may be held by each of the first oil reservoir section 406 and the third oil reservoir section 414 may be approximately equal, and a volume of lubricating fluid which may be held by the second oil reservoir section 324 may be less than the volume held by the first oil reservoir section 406 and the third oil reservoir section 414. Dispersion of the volume of lubricating fluid in the oil reservoir 346 through the sections of the oil reservoir 346 may assist in thermal dissipation of heat from the lubricating fluid, such as through walls of the sections of the oil reservoir 346. For example, the serpentine shape of the oil reservoir 346, including the three oil reservoir sections and the at least two U-turns, creates a greater surface area for the lubricating fluid to be distributed across and in contact with, compared to other oil reservoir shapes. The greater surface area provides more surface area for the volume of lubricating fluid to contact and dissipate heat through.

Figure 5A:
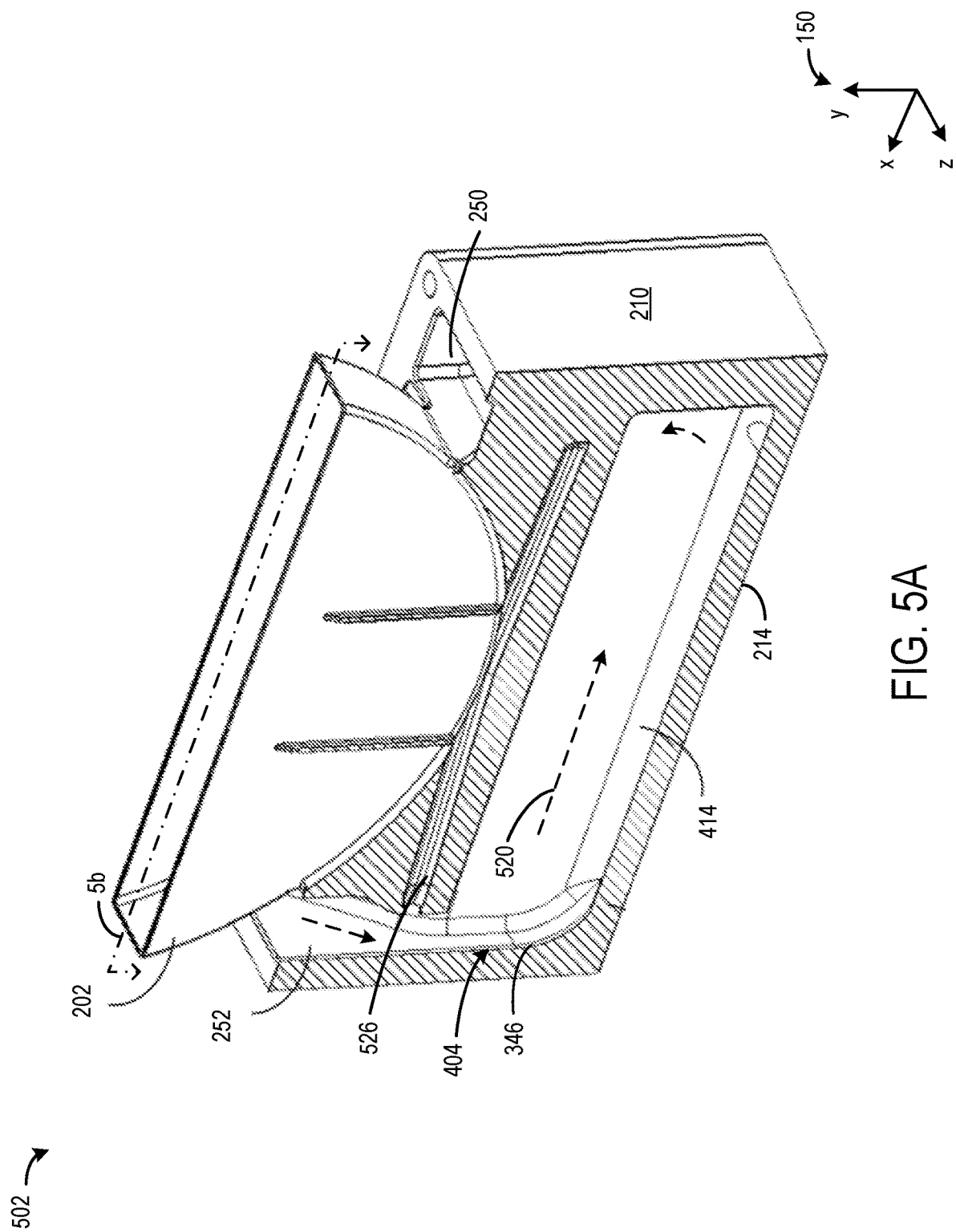
FIG. 5A shows a perspective view of a first cross-section view of the gearbox of FIGS. 2A-2B.
Figure 5B:
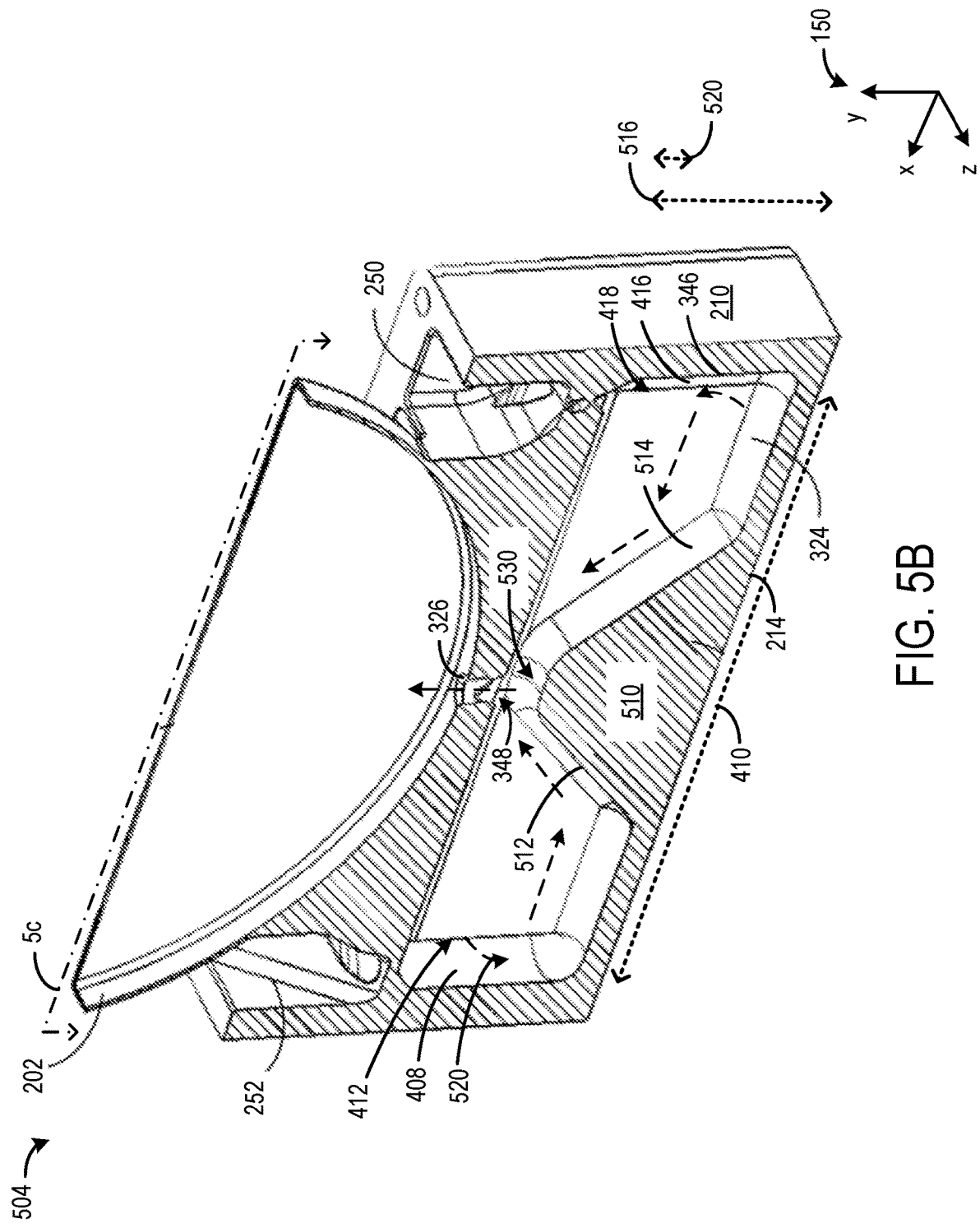
FIG. 5B shows a perspective view of a second cross-section view of the gearbox of FIGS. 2A-2B.
Figure 5C:
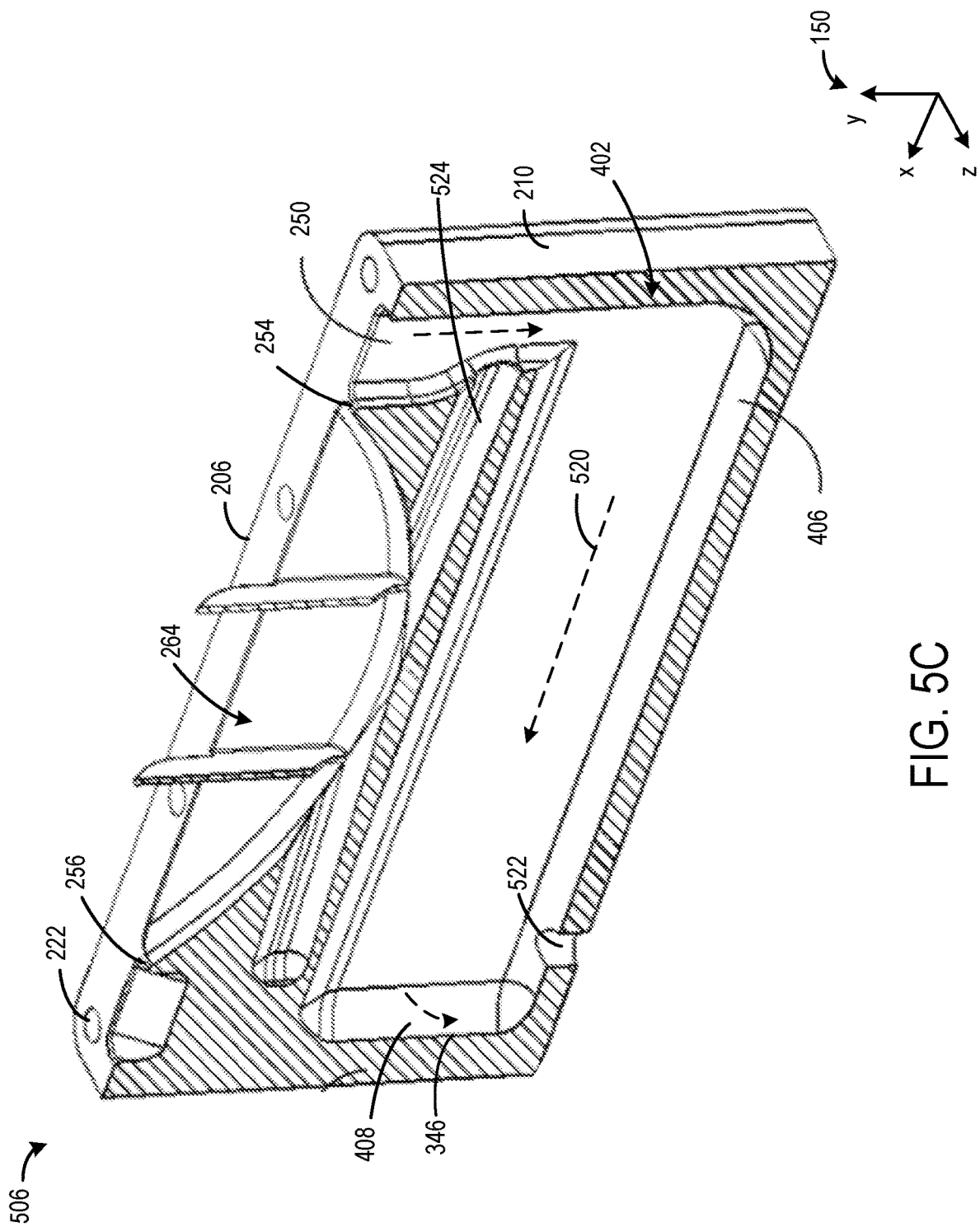
FIG. 5C shows a perspective view of a third cross-section view of the gearbox of FIGS. 2A-2B.

Turning to FIGS. 5A-5C, a plurality of cross-sectional views are shown of the apparatus 200. FIG. 5A shows a first cross-sectional view 502 taken along line 5*a*-5*a* of FIG. 2B. FIG. 5B shows a second cross-sectional view 504 taken along like 5*b*-5*b* of FIG. 5A, and FIG. 5C shows a third cross-sectional view 506 is taken along line 5*c*-5*c* of FIG. 5B. The plurality of cross-sectional views show each of the first oil reservoir section 406, the second oil reservoir section 324, and the third oil reservoir section 414 in further detail.

As briefly described with respect to FIG. 4, volumes of each of the first oil reservoir section 406 and the third oil reservoir section 414 may be approximately equal, and a volume of the second oil reservoir section 324 may be less than the volumes of each of the first oil reservoir section 406 and the third oil reservoir section 414. The relatively reduced volume of the second oil reservoir section 324 is due to inclusion of a sloped section 510 which extends from the base bottom 214 of the oil reservoir base 204 towards the curved shroud 202. The sloped section 510 may be formed of a first slope 512 adjacent to the first side 412 of the second oil reservoir section 324 and a second slope 514 adjacent to the second side 418 of the second oil reservoir section 324. The first slope 512 and the second slope 514 are coupled by a curved peak 530 at the approximate center of the first length 410 of the second oil reservoir section 324. At each of the first side 412 and the second side 418, the second oil reservoir section 324 has a second height 516. The second height 516 gradually decreases from a base of the sloped section 510 to a third height 518 at the curved peak 530 of the sloped section 510. The curved peak, and therefore a maximum height of the sloped section 510, is vertically aligned with the metering orifice 326. The curved peak 530 and the metering orifice are separated by the third height 518. In some examples, the third height 518 of the second oil reservoir section 324 may be positioned along the first length 410 of the second oil reservoir section 324 at a position other than the approximate center, so long as the third height 518 is in vertical alignment with the metering orifice 326.

Figure 6:
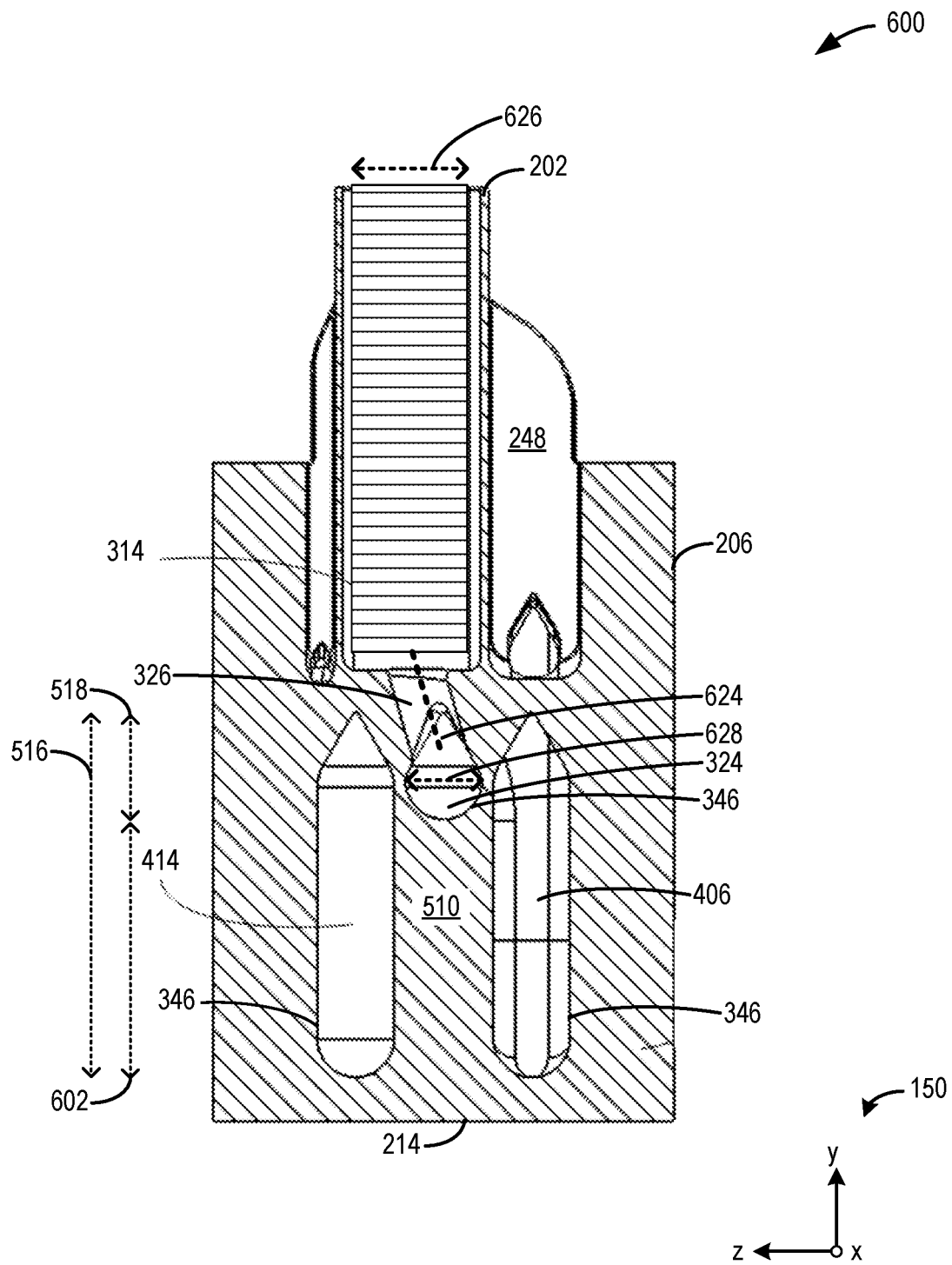
FIG. 6 shows a middle side-view section of the gearbox of FIGS. 2A-2B.

When the gear 314 (as shown in FIGS. 3 and 6) is rotated, lubricating fluid may splash out of the curved shroud 202 and be directed into at least one of the first side oil collector 250 and the second side oil collector 252. A plurality of dashed arrows 520 show example flow paths of the lubricating fluid. As briefly described with respect to FIG. 2A and further described with respect to FIGS. 5A-5C, the first side oil collector 250 may be angled a first direction away from a plane in which the gear 314 is positioned (e.g., the y-x plane, with respect to the axis system 150) and the second side oil collector 252 may be angled a second direction, opposite the first direction, away from the plane in which the gear 314 is positioned.

Lubricating fluid which is driven out of the curved shroud 202 and captured by the first side oil collector 250 is directed from the first side oil collector 250, in a direction of gravity, into the first oil reservoir section 406, as shown in the third cross-sectional view 506. Lubricating fluid is directed horizontally along the first length 410 of the first oil reservoir section 406 in a first direction. In some embodiments, such as the example shown in FIGS. 5A-5C, the first oil reservoir section 406 may include an outlet 522 which extends through the base bottom 214 of the oil reservoir base 204 to selectively fluidly couple the oil reservoir 346 to the exterior of the apparatus 200. The outlet 522 may be plugged, closed, or otherwise sealed, for example, using an oil cap, to uncouple the oil reservoir 346 from the exterior of the apparatus 200. The outlet 522 may be opened (e.g., by removing the oil cap) to void the apparatus 200 of lubricating fluid. In some examples, the outlet 522 may be formed in a section of the oil reservoir 346 other than the first oil reservoir section 406. The outlet 522 may be an example of the outlet 122 of FIG. 1 and may couple the oil reservoir 346 to the oil circuit 120. Lubricating fluid which does not exit the oil reservoir 346 via the outlet 522 (e.g., when the outlet 522 is closed, such as by the oil cap) is directed into the first U-turn 408 and further into the second oil reservoir section 324 in a second direction, opposite the first direction, as shown in the second cross-section 504. Lubricating fluid is directed up the first slope 512 of the sloped section 510 as lubricating fluid accumulates in the second oil reservoir section 324.

Lubricating fluid which is driven out of the curved shroud 202 and captured by the second side oil collector 252 is directed from the second side oil collector 252, in a direction of gravity, into the third oil reservoir section 414, as shown in the first cross-sectional view 502. Lubricating fluid is directed horizontally along the first length 410 of the third oil reservoir section 414 in the second direction and into the second U-turn 416. The lubricating fluid is further directed into the second oil reservoir section 324 in the first direction, opposite the second direction, as shown in the second cross-section 504. Lubricating fluid is directed up the second slope 514 of the sloped section 510 as lubricating fluid accumulates in the second oil reservoir section 324. Lubricating fluid captured by both the first side oil collector 250 and the second side oil collector 252 may be returned to the curved shroud 202 from the oil reservoir 346 via the metering orifice 326, which fluidly couples the curved shroud 202 and the second oil reservoir section 324. Lubricating fluid at the curved peak of the sloped section is directed into a first end 348 of the metering orifice 326, which couples the metering orifice 326 to the second oil reservoir section 324. The metering orifice 326 may provide controlled communication between the curved shroud 202 and the oil reservoir 346, such that lubricating fluid does not flow from the curved shroud 202 into the second oil reservoir section 324 and instead is directed to flow in a direction opposite the direction of gravity into the curved shroud 202 from the oil reservoir 346.

As lubricating fluid captured by both the first side oil collector 250 and the second side oil collector 252 flows through the sections of the oil reservoir 346, heat captured from the gear 314 by the lubricating fluid may be dissipated from the lubricating fluid. As described above, dispersion of the volume of lubricating fluid in the oil reservoir 346 through the sections of the oil reservoir 346 may provide more surface area for the lubricating fluid to be in contact with, compared to other oil reservoir designs. The high thermal conductivity material which forms the walls of the sections of the oil reservoir 346 (e.g., the surface area which the lubricating fluid is in contact with) and walls of the oil reservoir 346 may cool the lubricating fluid by dissipating heat therefrom. Additionally, the cavities in the walls of the oil reservoir 346 may assist in thermal dissipation of heat from the lubricating fluid by enabling circulating airflow through the walls of the oil reservoir 346, which may cool the walls of the oil reservoir 346 and enable further sequestering of heat from the lubricating fluid by the high thermal conductivity material. In this way, a temperature of the lubricating fluid may decrease from a first temperature to a second temperature, less than the first temperature, as the lubricating fluid flows through the oil reservoir 346, such that the temperature of lubricating fluid which is driven out of the curved shroud is greater than the temperature of lubricating fluid returned to the curved shroud 202 via the metering orifice 326.

As described with respect to FIG. 2A, the apparatus 200 includes the first closed tank 264 and the second closed tank 266 on either side of the curved shroud 202 (e.g., adjacent to the front wall 232 and the rear wall 234, respectively). The apparatus 200 may further include a first drain channel 524, parallel to the first oil reservoir section 406, and a second drain channel 526, parallel to the third oil reservoir section 414. The first drain channel 524 fluidly couples the first closed tank 264 to the oil reservoir 346 at the first end 402 of the oil reservoir 346 and the second drain channel 526 fluidly couples the second closed tank 266 to the oil reservoir 346 at the second end 404 of the oil reservoir 346. Both the first drain channel 524 and the second drain channel 526 may draw lubricating fluid captured by the first closed tank 264 and the second closed tank 266, respectively, into the respective end of the oil reservoir 346. In this way, the first drain channel 524 and the second drain channel 526 enable recirculation of lubricating fluid through the apparatus 200, avoid collection of debris in the first closed tank 264 and/or the second closed tank 266, and allow voiding of the apparatus 200 of lubricating fluid (e.g., by opening the outlet 522). The first drain channel 524 and the second drain channel 526 are separated from each other and from respective oil reservoir sections by walls of the oil reservoir 346, as shown in FIGS. 5A-5C.

Turning to FIG. 6, a side cross-section 600 is shown of the apparatus 200. The side cross-section 600 is taken along the line 6-6 of FIG. 2B. The side cross-section 600 is to be understood as bisecting the apparatus 200 at the center of the sloped section 510 (e.g., at the curved peak) along the y-z plane, with respect to the axis system 150. FIG. 6 shows coupling of the metering orifice 326 to the curved shroud 202, as well as the difference in height among the sections of the oil reservoir 346, which may enable lubricating fluid which collects in the second oil reservoir section 324 to be returned to the curved shroud 202 via the metering orifice 326. The gear 314 is shown in the side cross-section 600, positioned in the curved shroud 202.

As described with respect to FIGS. 5A-5C, the second oil reservoir section 324 has the third height 518 at the curved peak 530 of the sloped section 510. Each of the first oil reservoir section 406 and the third oil reservoir section 414 may have the second height 516 along the first length 410 (e.g., along the x-axis, with respect to the axis system 150) of the respective section. The sloped section 510 may have a fourth height 602 which is a difference in the second height 516 and the third height 518. The curved peak 530 of the sloped section 510 may have a teardrop cross-section, which may assist in holding lubricating fluid at the curved peak 530 (e.g., within the third height 518) such that the lubricating fluid is in proximity to the metering orifice 326.

The metering orifice 326 may be positioned at an angle, with respect to the y-x axis, to fluidly couple the curved shroud 202 and the second oil reservoir section 324 and to assist in controlling a flow of lubricating fluid from the oil reservoir 346 to the curved shroud 202. A metering orifice axis 624 indicates the angle at which the metering orifice 326 is positioned. For example, the second oil reservoir section 324 may not be in direct vertical alignment with the curved shroud 202 and may instead be offset towards the base front wall 206 with respect to the curved shroud 202 (e.g., along the z-axis, with respect to the axis system 150). The metering orifice 326 may be angled the angle of the metering orifice axis 624 to direct lubricating fluid into the curved shroud 202 at a midpoint of a width 626 of the gear 314 from a center of a section width 628 of the second oil reservoir section 324.

In some examples, each of the first oil reservoir section 406 and the third oil reservoir section 414 has an elongated teardrop cross-section, where the respective oil reservoir section has a curved base adjacent to the base bottom 214, a triangular top adjacent to the curved shroud 202, and a linear body coupling the curved base and the triangular top. The elongated teardrop shape may assist in increasing the surface area of the walls of the sections of the oil reservoir 346 such that thermal dissipation of the lubricating fluid using the high thermal conductivity material which forms the walls may be increased. Additionally, compared to a rectangular cross-section, the elongated teardrop shape may assist in quickly guiding a flow of lubricating fluid through the oil reservoir 346.

FIG. 7 shows a view 700 of the second cross-section 504 of the apparatus 200 shown in FIGS. 5A-5C. In the view 700, the cavities 216 are shown. The apparatus 200 is formed using additive manufacturing, such as 3-D printing, which may enable the cavities 216 to be infilled with a gyroid pattern throughout the walls of the oil reservoir 346 while creating uninterrupted surfaces for walls of the oil reservoir sections, as shown in FIG. 7. The cavities 216 extend through the walls of the oil reservoir 346 (e.g., the base front wall 206, the base rear wall 208, the base first side wall 210, the base second side wall 212) and the base bottom 214 to uninterrupted surfaces (e.g., without the cavities 216) of the walls of the oil reservoir sections.

The base second side wall 212 extends towards a center of the oil reservoir base 204 (e.g., towards the metering orifice 326) around the second side oil collector 252 and between the curved shroud 202 and the second oil reservoir section 324. Similarly, the base first side wall 210 extends towards the center of the oil reservoir base 204 (e.g., towards the metering orifice 326) around the first side oil collector 250 and between the curved shroud 202 and the second oil reservoir section 324. Inclusion of the cavities 216 in the portions of the base first side wall 210 and the base second side wall 212 between the second oil reservoir section 324 and the curved shroud 202 may enable thermal dissipation from the uninterrupted wall (e.g., without the cavities 216) of the base curve 236 of the curved shroud 202, similar to thermal dissipation of the uninterrupted surfaces of the walls of the oil reservoir sections. Air may flow from the exterior 220 of the apparatus 200 into the oil reservoir base 204 through the gyroid pattern in the cavities 216 and circulate through the cavities 216 to cool the high thermal conductivity material which in turn cools the lubricating fluid flowing through the oil reservoir.

In this way, lubrication efficiency may be increased compared to conventional gearbox lubrication systems. Dispersion of the volume of lubricating fluid in the oil reservoir through the sections of the oil reservoir may provide more surface area for the lubricating fluid to be in contact with, compared to conventional oil reservoir designs. The high thermal conductivity material which forms the walls of the sections of the oil reservoir, the curved shroud (e.g., the surface area which the lubricating fluid is in contact with), and walls of the oil reservoir may cool the lubricating fluid by dissipating heat therefrom. Additionally, the cavities in the walls of the oil reservoir may assist in thermal dissipation of heat from the lubricating fluid by enabling circulating airflow through the walls of the oil reservoir, which may cool the walls of the oil reservoir and the curved shroud, enabling further sequestering of heat from the lubricating fluid by the high thermal conductivity material. In this way, a temperature of the lubricating fluid may decrease as the lubricating fluid flows through the oil reservoir, such that the temperature of lubricating fluid which is driven out of the curved shroud is greater than the temperature of lubricating fluid returned to the curved shroud via the metering orifice. A volume of lubricating fluid desired to provide sufficient lubrication to the gear may be retained in the curved shroud by the continuous replenishing of cooled lubricating fluid from the oil reservoir via the metering orifice. Additionally, as cooled lubricating fluid is used to lubricate the rotating gear, a useable life of the gear and other elements of the gearbox may be increased, as the gear may operate within a desired temperature range, which may decrease degradation of the gear due to excessive heat.

FIGS. 2A-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIGS. 1-7 provide for a method for a gearbox, such as the gearbox 302 and/or a gearbox including the apparatus 200. The method is herein described with respect to the apparatus 200. The method includes rotating a gear (e.g., the gear 314) in a first direction. For example, the first direction may be clockwise or counterclockwise depending on a requested output of the gearbox, such as driving a vehicle in a forward or a reverse direction.

Using teeth of the gear, when the gear is rotating, the method further includes driving lubricating fluid out of a curved shroud (e.g., the curved shroud 202) in which the gear is positioned. When the gear is rotated in a clockwise direction, lubricating fluid may be driven out of a left side of the curved shroud (e.g., the left side in the same plane as the curved shroud and the gear). In some examples, a volume of lubricating fluid which is not driven out of the left side of the curved shroud may be carried by teeth of the gear (e.g., on a surface of and/or in recesses between teeth of the gear) and be driven towards a right side of the gear (e.g., the right side of the gear opposite the left side of the curved shroud and in the same plane as the curved shroud and the gear). When the gear is rotated in a counterclockwise direction, lubricating fluid may be driven out of a right side of the curved shroud, the right side opposite the left side (e.g., the right side in the same plane as the curved shroud and the gear). In some examples, a volume of lubricating fluid which is not driven out of the right side of the curved shroud may be carried by teeth of the gear (e.g., on a surface of and/or in recesses between teeth of the gear) and be driven towards a left side of the gear (e.g., the left side of the gear opposite the right side of the curved shroud and in the same plane as the curved shroud and the gear).

The method includes capturing driven lubricating fluid using a first side oil collector (e.g., the first side oil collector 250) and/or a second side oil collector (e.g., the second side oil collector 252). Driven lubricating fluid may splash against lateral walls (e.g., lateral walls 330) of the gearbox housing, and the lateral walls direct the driven lubricating fluid, in the direction of gravity, down the lateral walls and into at least one of the first side oil collector and/or the second side oil collector.

The method further includes directing captured lubricating fluid from the first side oil collector and the second side oil collector, in the direction of gravity, into an oil reservoir (e.g., the oil reservoir 346) fluidly coupled to the first side oil collector and the second side oil collector. The first side oil collector is coupled to a first end (e.g., the first end 402) of the oil reservoir and the second side oil collector is coupled to a second end (e.g., the second end 404) of the oil collector. Between the first end and the second end, the oil collector turns back on itself at least twice. Directing captured lubricating fluid from the first side oil collector into the oil reservoir includes directing captured lubricating fluid from the first side oil collector into a first oil reservoir section (e.g., the first oil reservoir section 406), directing the captured lubricating fluid horizontally along a length (e.g., the first length 410) of the first oil reservoir section in a first direction and through a first U-turn (e.g., the first U-turn 408). The first U-turn directs the lubricating fluid into a second oil reservoir section (e.g., the second oil reservoir section 324) in a second direction, opposite the first direction. As a volume of captured lubricating fluid in the oil reservoir increases, the captured lubricating fluid is directed up a first slope (e.g., the first slope 512) of a sloped section (e.g., the sloped section 510) of the second oil reservoir section. Directing captured lubricating fluid from the second side oil collector into the oil reservoir includes directing captured lubricating fluid from the second side oil collector into a third oil reservoir section (e.g., the third oil reservoir section 414), directing the captured lubricating fluid horizontally along a length (e.g., the first length 410) of the third oil reservoir section in the second direction and through a second U-turn (e.g., the second U-turn 416). The second U-turn directs the lubricating fluid into the second oil reservoir section in the first direction, opposite the second direction. As a volume of captured lubricating fluid in the oil reservoir increases, the captured lubricating fluid is directed up a second slope (e.g., the second slope 514) of the sloped section of the second oil reservoir section.

The method further includes directing captured lubricating fluid from the oil reservoir into the curved shroud via a metering orifice (e.g., the metering orifice 326) in a direction opposite the direction of gravity. Captured lubricating fluid which is directed up the first slope and the second slop of the sloped section is further directed into a first end (e.g., the first end 348) of the metering orifice and into the curved shroud. The metering shroud is configured such that lubricating fluid may not flow from the curved shroud into the metering orifice and instead flows from the metering orifice into the curved shroud.

The apparatus is formed of high thermal conductivity material which enables thermal dissipation. Further, walls of the oil reservoir include multiple cavities, which may have a gyroid infill pattern. The method further includes decreasing a temperature of the captured lubricating fluid from a first temperature to a second temperature, the second temperature less than the first temperature. Lubricating fluid may have the first temperature when in contact with the gear, when being driven out of the curved shroud by rotation of the gear, and when entering the oil reservoir via the first side oil collector and the second side oil collector. As the captured lubricating fluid is directed through the sections of the oil reservoir, the first temperature is gradually decreased to the second temperature by circulating air through the multiple cavities in walls of the oil reservoir. For example, the high thermal conductivity material with which the captured lubricating fluid is in contact enables thermal dissipation from the lubricating fluid, and circulation of air through the multiple cavities in walls of the oil reservoir enables thermal dissipation from the high thermal conductivity material, enabling further thermal dissipation from the lubricating fluid via the high thermal conductivity material.

The method described herein may provide a gearbox which uses a smaller heat mass (e.g., smaller volume of lubricating fluid) to provide sufficient thermal dissipation, compared to other gearboxes. The smaller heat mass may reduce a churning effect, relative to gearboxes which use a larger volume of lubricating fluid, which decreases mechanical power losses and increases a power output of the gearbox, compared to other gearboxes. Thermal dissipation of lubricating fluid and recycling of cooled lubricating fluid through the apparatus of the gearbox may slow aging of lubricating fluid, compared to other gearbox and apparatus designs which provide less thermal dissipation, by maintaining the fluid temperature within a desired range and increasing a useable life of the lubricating fluid, as well as a useable life of seals, bearings, and moving elements cooled and lubricated by the lubricating fluid.

The technical effect of using a high thermal conductivity material and walls of an oil reservoir having multiple cavities to cool lubricating fluid, and the method for the gearbox described herein, is an increased useable life of gearbox elements by decreasing moving components wear.

The disclosure also provides support for an apparatus, comprising: a curved shroud enclosing a portion of a gear, a first side oil collector, a second side oil collector, an oil reservoir having a first end fluidly coupled to the first side oil collector and a second end fluidly coupled to the second side oil collector, the oil reservoir turning back on itself at least twice between the first end and the second end, and walls of the oil reservoir having multiple cavities, and a metering orifice fluidly coupling the oil reservoir to the curved shroud. In a first example of the system, the curved shroud is a semi-circular baffle. In a second example of the system, optionally including the first example, the first side oil collector is angled a first direction away from a front face of the gear and a rear face of the gear, the front face opposite the rear face, and the second side oil collector is angled a second direction, opposite the first direction. In a third example of the system, optionally including one or both of the first and second examples, a first oil reservoir section extends along a first length between the first side oil collector and a first U-turn, a second oil reservoir section extends along the first length between the first U-turn and a second U-turn, and a third oil reservoir section extends along the first length between the second U-turn and the second side oil collector. In a fourth example of the system, optionally including one or more or each of the first through third examples, the second oil reservoir section includes a sloped section, where a height of the second oil reservoir section gradually decreases from a first height at the first U-turn and the second U-turn to a second height, less than the first height, at an approximate center of the first length. In a fifth example of the system, optionally including one or more or each of the first through fourth examples, the metering orifice is positioned at the approximate center of the first length in vertical alignment with a curved peak of the sloped section of the second oil reservoir section. In a sixth example of the system, optionally including one or more or each of the first through fifth examples, walls of the oil reservoir include a base first side wall, a base second side wall, a base front wall, and a base rear wall, where the base first side wall extends between the first oil reservoir section and the second oil reservoir section and the base second side wall extends between the second oil reservoir section and the third oil reservoir section. In a seventh example of the system, optionally including one or more or each of the first through sixth examples, the first oil reservoir section further includes an outlet in a housing of the apparatus adjacent to the first U-turn, where the outlet fluidly couples the oil reservoir to an exterior of the apparatus. In an eighth example of the system, optionally including one or more or each of the first through seventh examples, a first channel extends from and is fluidly coupled to the first side oil collector, parallel to the first oil reservoir section, and a second channel extends from and is fluidly coupled to the second side oil collector, parallel to the third oil reservoir section, the first channel and the second channel separated from each other by a housing of the apparatus. In a ninth example of the system, optionally including one or more or each of the first through eighth examples, the apparatus is formed of high thermal conductivity material. In a tenth example of the system, optionally including one or more or each of the first through ninth examples, the cavities have a gyroid infill pattern. In an eleventh example of the system, optionally including one or more or each of the first through tenth examples, each of the first side oil collector, the second side oil collector, and the metering orifice have at least one of a circular, triangular, rectangular, teardrop, or square cross-section.

The disclosure also provides support for a method for a gearbox, comprising: rotating a gear in a first direction, driving lubricating fluid out of a curved shroud in which the gear is positioned using teeth of the gear, capturing driven lubricating fluid using a first side oil collector and/or a second side oil collector, directing captured lubricating fluid from the first side oil collector and the second side oil collector, in a direction of gravity, into an oil reservoir fluidly coupled to the first side oil collector and the second side oil collector, and directing captured lubricating fluid from the oil reservoir into the curved shroud via a metering orifice in a direction opposite the direction of gravity. In a first example of the method, lateral walls direct driven lubricating fluid in the direction of gravity into the first side oil collector and the second side oil collector. In a second example of the method, optionally including the first example, directing captured lubricating fluid from the first side oil collector and the second side oil collector into the oil reservoir comprises: directing captured lubricating fluid from the first side oil collector into a first oil reservoir section, directing captured lubricating fluid horizontally along a length of the first oil reservoir section in a first direction and through a first U-turn, the first U-turn directing captured lubricating fluid into a second oil reservoir section in a second direction opposite the first direction, directing captured lubricating fluid up a first slope of a sloped section of the second oil reservoir section and into a first end of the metering orifice, directing captured lubricating fluid from the second side oil collector into a third oil reservoir section, directing captured lubricating fluid horizontally along the length of the third oil reservoir section in the second direction and through a second U-turn, the second U-turn directing oil through the second oil reservoir section in the first direction, and directing captured lubricating fluid up a second side of the sloped section of the second oil reservoir section and into the first end of the metering orifice. In a third example of the method, optionally including one or both of the first and second examples, the method further comprises: decreasing a temperature of the captured lubricating fluid from a first temperature to a second temperature, the second temperature less than the first temperature, by circulating air through multiple cavities of walls of the oil reservoir.

The disclosure also provides support for an oil circuit, comprising: an oil pump, a gearbox housing, a delivery line fluidly coupling the oil pump to the gearbox housing, and an apparatus coupled to the gearbox housing, the apparatus formed of a curved shroud enclosing a portion of a gear, a first side oil collector, a second side oil collector, an oil reservoir having a first end fluidly coupled to the first side oil collector and a second end fluidly coupled to the second side oil collector, the oil reservoir further including at least two U-turns between the first end and the second end, and walls of the oil reservoir having multiple cavities, and a metering orifice fluidly coupling the oil reservoir to the curved shroud. In a first example of the system, a first end of the delivery line is coupled to an inlet of the gearbox housing and a second end of the delivery line, opposite the first end, is coupled to an outlet of the apparatus. In a second example of the system, optionally including the first example, the oil pump is configured to deliver a lubricating fluid having a first temperature to the curved shroud via an inlet of the gearbox housing to lubricate the gear, and the gear is configured to rotate in a first direction and/or a second direction, where rotation of the gear increases a temperature of the lubricating fluid in contact with the gear from the first temperature to a second temperature, the second temperature greater than the first temperature. In a third example of the system, optionally including one or both of the first and second examples, the oil reservoir is configured with a first oil reservoir section extending along a first length between the first side oil collector and a first U-turn, a second oil reservoir section extending along the first length between the first U-turn and a second U-turn, and a third oil reservoir section extending along the first length between the second U-turn and the second side oil collector, the second oil reservoir section is configured with a sloped section, where a height of the second oil reservoir section gradually decreases from a first height at the first U-turn and the second U-turn to a second height, less than the first height, at an approximate center of the first length, and the metering orifice is positioned at the approximate center of the first length in vertical alignment with a curved peak of the sloped section of the second oil reservoir section.

It will be appreciated that the configurations and routines disclosed herein are exemplary in nature, and that these specific embodiments are not to be considered in a limiting sense, because numerous variations are possible. Moreover, unless explicitly stated to the contrary, the terms "first,"

"second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An apparatus, comprising:
a curved shroud enclosing a portion of a gear;
a first side oil collector;
a second side oil collector;
an oil reservoir having a first end fluidly coupled to the first side oil collector and a second end fluidly coupled to the second side oil collector, the oil reservoir turning back on itself at least twice between the first end and the second end, and walls of the oil reservoir having multiple cavities; and
a metering orifice fluidly coupling the oil reservoir to the curved shroud.

2. The apparatus of claim 1, wherein the curved shroud is a semi-circular baffle.

3. The apparatus of claim 1, wherein the first side oil collector is angled a first direction away from a front face of the gear and a rear face of the gear, the front face opposite the rear face, and the second side oil collector is angled a second direction, opposite the first direction.

4. The apparatus of claim 1, wherein a first oil reservoir section extends along a first length between the first side oil collector and a first U-turn, a second oil reservoir section extends along the first length between the first U-turn and a second U-turn, and a third oil reservoir section extends along the first length between the second U-turn and the second side oil collector.

5. The apparatus of claim 4, wherein the second oil reservoir section includes a sloped section, where a height of the second oil reservoir section gradually decreases from a first height at the first U-turn and the second U-turn to a second height, less than the first height, at an approximate center of the first length.

6. The apparatus of claim 5, wherein the metering orifice is positioned at the approximate center of the first length in vertical alignment with a curved peak of the sloped section of the second oil reservoir section.

7. The apparatus of claim 4, wherein walls of the oil reservoir include a base first side wall, a base second side wall, a base front wall, and a base rear wall, where the base first side wall extends between the first oil reservoir section and the second oil reservoir section and the base second side wall extends between the second oil reservoir section and the third oil reservoir section.

8. The apparatus of claim 4, wherein the first oil reservoir section further includes an outlet in a housing of the apparatus adjacent to the first U-turn, where the outlet fluidly couples the oil reservoir to an exterior of the apparatus.

9. The apparatus of claim 4, wherein a first drain channel extends from and is fluidly coupled to the first side oil collector, parallel to the first oil reservoir section, and a second drain channel extends from and is fluidly coupled to the second side oil collector, parallel to the third oil reservoir section, the first drain channel and the second drain channel separated from each other by a housing of the apparatus.

10. The apparatus of claim 1, wherein the apparatus is formed of high thermal conductivity material.

11. The apparatus of claim 1, wherein the cavities have a gyroid infill pattern.

12. The apparatus of claim 1, wherein each of the first side oil collector, the second side oil collector, and the metering orifice have at least one of a circular, triangular, rectangular, teardrop, or square cross-section.

13. An oil circuit, comprising:
an oil pump;
a gearbox housing;
a delivery line fluidly coupling the oil pump to the gearbox housing; and
an apparatus coupled to the gearbox housing, the apparatus formed of a curved shroud enclosing a portion of a gear, a first side oil collector, a second side oil collector, an oil reservoir having a first end fluidly coupled to the first side oil collector and a second end fluidly coupled to the second side oil collector, the oil reservoir further including at least two U-turns between the first end and the second end, and walls of the oil reservoir having multiple cavities, and a metering orifice fluidly coupling the oil reservoir to the curved shroud.

14. The oil circuit of claim 13, wherein a first end of the delivery line is coupled to an inlet of the gearbox housing and a second end of the delivery line, opposite the first end, is coupled to an outlet of the apparatus.

15. The oil circuit of claim 13, wherein the oil pump is configured to deliver a lubricating fluid having a first temperature to the curved shroud via an inlet of the gearbox housing to lubricate the gear, and the gear is configured to rotate in a first direction and/or a second direction, where rotation of the gear increases a temperature of the lubricating fluid in contact with the gear from the first temperature to a second temperature, the second temperature greater than the first temperature.

16. The oil circuit of claim 15, wherein:
the oil reservoir is configured with a first oil reservoir section extending along a first length between the first side oil collector and a first U-turn, a second oil reservoir section extending along the first length between the first U-turn and a second U-turn, and a third oil reservoir section extending along the first length between the second U-turn and the second side oil collector;
the second oil reservoir section is configured with a sloped section, where a height of the second oil reservoir section gradually decreases from a first height at the first U-turn and the second U-turn to a second height, less than the first height, at an approximate center of the first length; and the metering orifice is positioned at the approximate center of the first length in vertical alignment with a curved peak of the sloped section of the second oil reservoir section.

\* \* \* \* \*